US 8,571,073 B2

(12) United States Patent
Ohkubo et al.

(10) Patent No.: US 8,571,073 B2
(45) Date of Patent: Oct. 29, 2013

(54) FRAME MAPPING APPARATUS AND FRAME MAPPING METHOD

(75) Inventors: Toshiaki Ohkubo, Kawasaki (JP); Toru Katagiri, Kawasaki (JP); Hiroyuki Honma, Kawasaki (JP); Hiromichi Makishima, Kawasaki (JP); Hiroyuki Kitajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 111 days.

(21) Appl. No.: 13/365,819

(22) Filed: Feb. 3, 2012

(65) Prior Publication Data
US 2012/0251127 A1 Oct. 4, 2012

(30) Foreign Application Priority Data

Mar. 29, 2011 (JP) ................................. 2011-073669

(51) Int. Cl.
*H04J 3/02* (2006.01)
(52) U.S. Cl.
USPC .......................................................... 370/537
(58) Field of Classification Search
USPC .................................. 370/465–467, 537–541
See application file for complete search history.

(56) References Cited

U.S. PATENT DOCUMENTS

| | | | | |
|---|---|---|---|---|
| 4,697,262 A * | 9/1987 | Segal et al. | ................... | 370/468 |
| 5,291,485 A * | 3/1994 | Afify et al. | .................... | 370/476 |
| 5,818,894 A | 10/1998 | Song | | |
| 6,501,398 B2 | 12/2002 | Toyokura | | |
| 6,674,771 B1 * | 1/2004 | Taniguchi | ...................... | 370/505 |
| 7,154,914 B1 * | 12/2006 | Pechner et al. | ............... | 370/516 |
| 7,539,196 B2 | 5/2009 | Flavin et al. | | |
| 7,649,900 B2 * | 1/2010 | Goody | .......................... | 370/401 |
| 7,787,448 B2 * | 8/2010 | Zhang | ........................... | 370/389 |
| 7,826,741 B2 * | 11/2010 | Katagiri | ......................... | 398/43 |
| 7,970,008 B2 | 6/2011 | Kisaka et al. | | |
| 2004/0114638 A1 * | 6/2004 | Matsuura et al. | ............. | 370/537 |
| 2004/0131090 A1 * | 7/2004 | Clauberg | ...................... | 370/540 |

FOREIGN PATENT DOCUMENTS

| | | |
|---|---|---|
| JP | 9-244873 A | 9/1997 |
| JP | 2001-339312 A | 12/2001 |
| JP | 2004-523959 A | 8/2004 |
| WO | WO-2008/035769 A | 3/2008 |

* cited by examiner

*Primary Examiner* — Hong Cho
(74) *Attorney, Agent, or Firm* — Fujitsu Patent Center

(57) ABSTRACT

An apparatus for mapping multiple lower-speed signal transmission frames to a higher-speed signal transmission frame. The apparatus includes buffers configured to buffer the lower-speed signal transmission frames, determination units configured to determine frequency justification information for the lower-speed signal transmission frames, a barrel shifter configured to receive signals output from the buffers, and a controller configured to control the barrel shifter to map the lower-speed signal transmission frames to the higher-speed signal transmission frame based on external settings for the respective lower-speed signal transmission frames and the frequency justification information determined by the determination units. When the minimum unit of the lower-speed signal transmission frames is a channel, the number of the buffers and the number of the determination units correspond to the maximum number of channels that can be multiplexed in the higher-speed signal transmission frame.

6 Claims, 31 Drawing Sheets

FIG.1

| COLUMN | 1 | .... | 7 | 8 | .... | 14 | 15 | 16 | 17 | .... | 3,824 | 3,825 | .... | 4,080 |
|---|---|---|---|---|---|---|---|---|---|---|---|---|---|---|
| ROW 1 | FA OH | | | OTUk OH | | | OPUk OH | | OPUk PAYLOAD | | | OTUk FEC | | |
| 2 | ODUk OH | | | | | | | | | | | | | |
| 3 | | | | | | | | | | | | | | |
| 4 | | | | | | | | | | | | | | |

AMP

| | 15 | 16 | JC | JC | JC | NJO | 17 | 18 |
|---|---|---|---|---|---|---|---|---|
| 1 | RES | | | | | | | |
| 2 | RES | | | | | | | |
| 3 | RES | | | | | | | |
| 4 | PSI | | | | | PJO1 | PJO2 | |

GMP

| | 15 | 16 |
|---|---|---|
| 1 | JC | JC |
| 2 | JC | JC |
| 3 | JC | JC |
| 4 | PSI | RES |

| NO. | LO_ODUj | INTERMEDIATE FRAME | | HO_ODUk | |
| --- | --- | --- | --- | --- | --- |
| 1 | ODU0 | ODTU01 x 2 | ODTUG1 PT=20 | OPU1 | ODU1 |
| 2 | ODU1 | ODTU12 x 4 | ODTUG2 PT=20 | OPU2 | ODU2 |
| 3 | ODUflex | ODTU2.ts x 8/ts | ODTUG2 PT=21 | | |
| 4 | ODU0 | ODTU2.1 x 8 | ODTUG2 PT=21 | | |
| 5 | ODU1 | ODTU12 x 4 | ODTUG2 PT=21 | | |
| 6 | ODU1 | ODTU13 x 16 | ODTUG3 PT=20 | OPU3 | ODU3 |
| 7 | ODU2 | ODTU23 x 4 | ODTUG3 PT=20 | | |
| 8 | ODUflex | ODTU3.ts x 32/ts | ODTUG3 PT=21 | | |
| 9 | ODU0 | ODTU3.1 x 32 | ODTUG3 PT=21 | | |
| 10 | ODU1 | ODTU13 x 16 | ODTUG3 PT=21 | | |
| 11 | ODU2e | ODTU3.9 x 3 | ODTUG3 PT=21 | | |
| 12 | ODU2 | ODTU23 x 4 | ODTUG3 PT=21 | | |
| 13 | ODUflex | ODTU4.ts x 80/ts | ODTUG4 PT=21 | OPU4 | ODU4 |
| 14 | ODU0 | ODTU4.1 x 80 | ODTUG4 PT=21 | | |
| 15 | ODU1 | ODTU4.2 x 40 | ODTUG4 PT=21 | | |
| 16 | ODU2e | ODTU4.8 x 10 | ODTUG4 PT=21 | | |
| 17 | ODU2 | ODTU4.8 x 10 | ODTUG4 PT=21 | | |
| 18 | ODU3 | ODTU4.31 x 2 | ODTUG4 PT=21 | | |

| NO. | HO_ODUj | INTERMEDIATE FRAME | | HO_ODUk | |
|---|---|---|---|---|---|
| 1 | ODU1 | ODTU12 × 4 | ODTUG2 PT=20 | OPU2 | ODU2 |
| 2 | ODU1 | ODTU12 × 4 | ODTUG2 PT=21 | | |
| 3 | ODU2 | ODTU13 × 4 | ODTUG3 PT=20 | OPU3 | ODU3 |
| 4 | ODU2 | ODTU13 × 4 | ODTUG3 PT=21 | | |
| 5 | ODU3 | ODTU4.31 × 2 | ODTUG4 PT=21 | OPU4 | ODU4 |

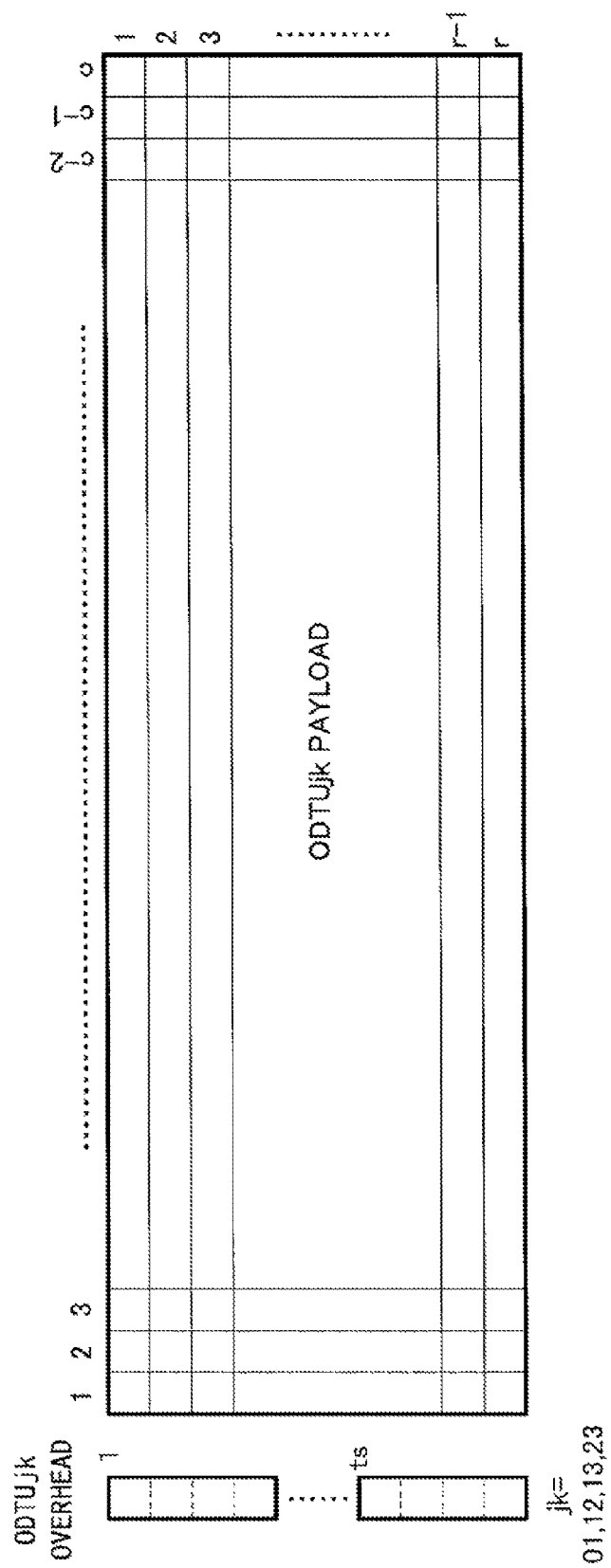

FIG.9B

| 2.5G TS | c | r | ts | ODTUjk PAYLOAD (BYTE) | ODTUjk OVERHEAD (BYTE) |
|---|---|---|---|---|---|
| ODTU12 | 952 | 16 | 1 | 15,232 | 1 x 4 |
| ODTU13 | 238 | 64 | 1 | 15,232 | 1 x 4 |
| ODTU23 | 952 | 64 | 4 | 60,928 | 4 x 4 |

FIG.9C

| 1.25G TS | c | r | ts | ODTUjk PAYLOAD (BYTE) | ODTUjk OVERHEAD (BYTE) |
|---|---|---|---|---|---|
| ODTU01 | 1,904 | 8 | 1 | 15,232 | 1 x 4 |
| ODTU12 | 952 | 32 | 2 | 30,464 | 2 x 4 |
| ODTU13 | 238 | 128 | 2 | 30,464 | 2 x 4 |
| ODTU23 | 952 | 128 | 8 | 121,856 | 8 x 4 |

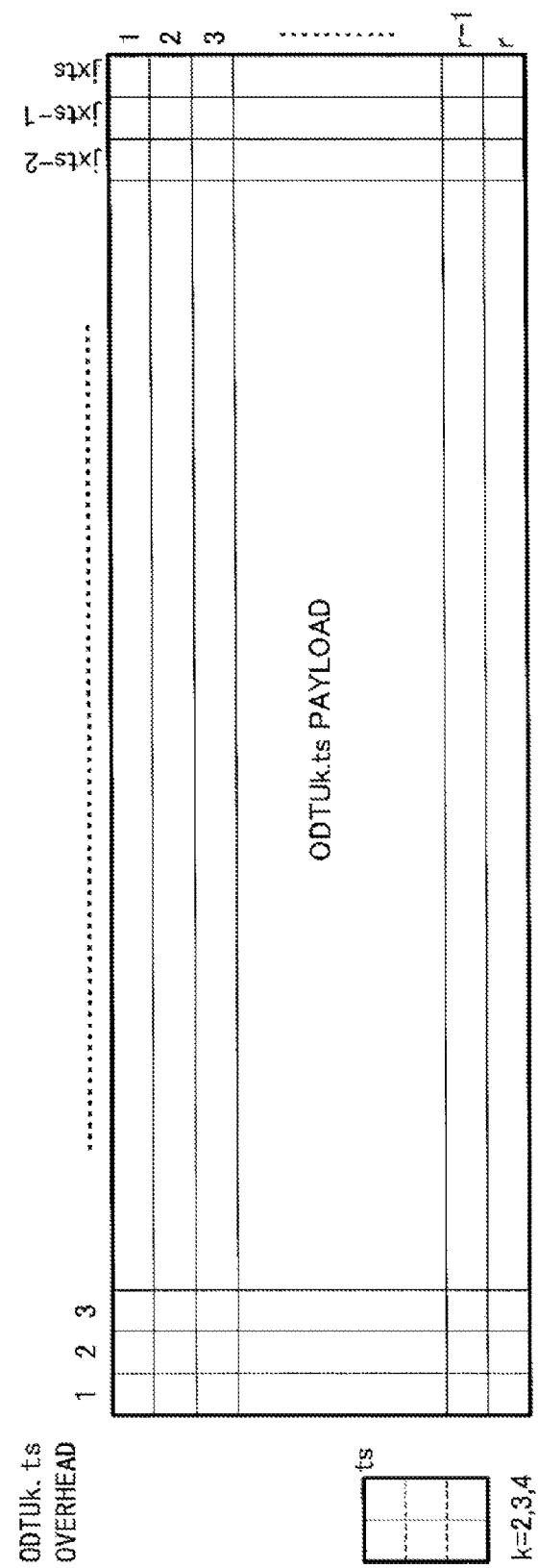

FIG.10B

| | j | r | ts | ODTUk.ts PAYLOAD (BYTE) | ODTUk.ts OVERHEAD (BYTE) |
|---|---|---|---|---|---|
| ODTU2.ts | 476 | 32 | 1 to 8 | 15,232 x ts | 1 x 6 |
| ODTU3.ts | 119 | 128 | 1 to 32 | 15,232 x ts | 1 x 6 |
| ODTU4.ts | 95 | 160 | 1 to 80 | 15200 x ts | 1 x 6 |

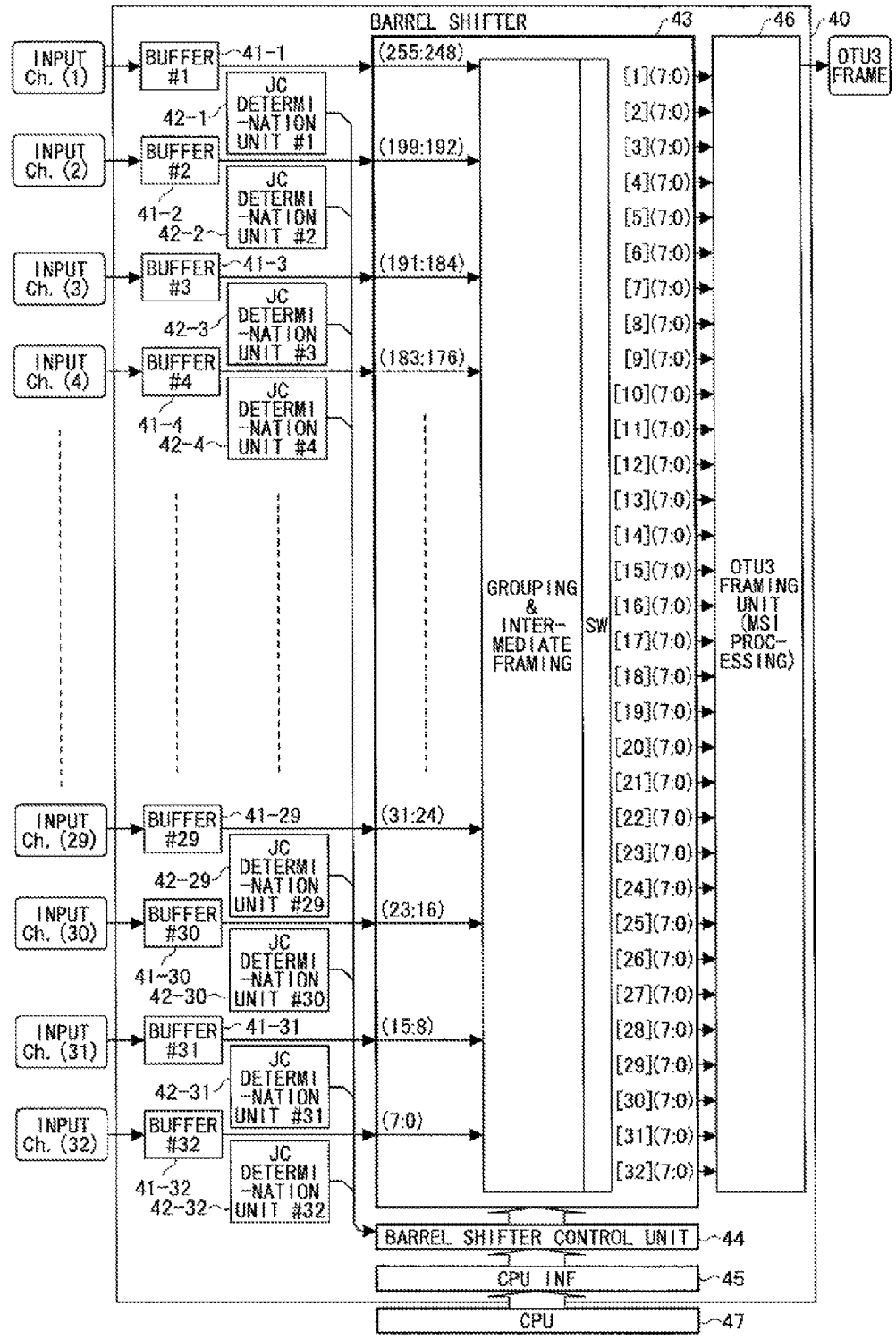

FIG.15A

| MFAS MULTI<br>BITS FRAME FRAME<br>(4)5678 ROW ROW | COLUMN | 1 | | | 15 16 17 18 | ....... | 31 32 33 34 | ........ | 47 48 49 50 | | ..... | 3,823 3,824 | |
|---|---|---|---|---|---|---|---|---|---|---|---|---|---|
| | | TSOH | | | TS1 | | | | | | | | 2.5G TS #<br>1.25G TS # |
| (0)0000 | 1<br>2<br>3<br>4 | 1<br>2<br>3<br>4 | | | | ⋮ | 15 16<br>16 16<br>17 1<br>18 2 | ⋮ | 15 31<br>16 32<br>1 1<br>2 2 | ⋮ | 15 31<br>16 32 | |
| (0)0001 | 5<br>6<br>7<br>8 | 1<br>2<br>3<br>4 | TSOH | TS2 | 1 1<br>2 2 | ⋮ | 15 15<br>16 16<br>17 1<br>18 2 | ⋮ | 15 31<br>16 32<br>1 1<br>2 2 | ⋮ | 15 31<br>16 32 | |
| | 61<br>62<br>63<br>64 | 1<br>2<br>3<br>4 | TSOH | TS16 | | ⋮ | 15<br>16<br>17<br>18 | ⋮ | | ⋮ | 15 31<br>16 32 | |
| (0)1111 | 65 1<br>66 2<br>67 3<br>68 4 | | TSOH | TS1 or TS17 | 1 1<br>2 2 | ⋮ | 15 15<br>16 16<br>17 1<br>18 2 | ⋮ | 15 31<br>16 32<br>1 1<br>2 2 | ⋮ | 15 31<br>16 32 | |
| (1)0000 | ..... | | | | | | | | | | | |
| (1)1111 | 125 61<br>126 62<br>127 63<br>128 64 | 1<br>2<br>3<br>4 | TSOH | TS16 or TS32 | 1 1<br>2 2 | ⋮ | 15 15<br>16 16<br>17 1<br>18 2 | ⋮ | 15 31<br>16 32<br>1 1<br>2 2 | ⋮ | 15 31<br>16 32 | |

| MFSA bits 5678 | TSOH 2.5G TS |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

| MFSA bits 45678 | TSOH 1.25G TS |
|---|---|
| 00000 | 1 |
| 00001 | 2 |
| 00010 | 3 |
| 00011 | 4 |
| 00100 | 5 |
| 00101 | 6 |
| 00110 | 7 |
| 00111 | 8 |
| 01000 | 9 |
| 01001 | 10 |
| 01010 | 11 |
| 01011 | 12 |
| 01100 | 13 |
| 01101 | 14 |
| 01110 | 15 |
| 01111 | 16 |
| 10000 | 17 |
| 10001 | 18 |
| 10010 | 19 |
| 10011 | 20 |
| 10100 | 21 |
| 10101 | 22 |
| 10110 | 23 |
| 10111 | 24 |
| 11000 | 25 |
| 11001 | 26 |
| 11010 | 27 |
| 11011 | 28 |
| 11100 | 29 |
| 11101 | 30 |
| 11110 | 31 |
| 11111 | 32 |

| CH | I_MBBST(19:0) | | | | CH | I_MBTOP | CH | I_MSIDT (7:0) | CH | I_MBPOS (6:0) |
|---|---|---|---|---|---|---|---|---|---|---|
| | (19:15) | (14:10) | (9:5) | (4:0) | | | | | | |
| CH #1 | 0x06 | 0x17 | 0x01 | 0x02 | CH #1 | 1 | CH #1 | 0x40 | CH #1 | 0x00 |
| CH #2 | 0x17 | 0x00 | 0x02 | 0x03 | CH #2 | 0 | CH #2 | 0x40 | CH #2 | 0x01 |
| CH #3 | 0x00 | 0x01 | 0x03 | 0x04 | CH #3 | 0 | CH #3 | 0x40 | CH #3 | 0x02 |
| CH #4 | 0x01 | 0x02 | 0x04 | 0x05 | CH #4 | 0 | CH #4 | 0x40 | CH #4 | 0x03 |
| CH #5 | 0x02 | 0x03 | 0x05 | 0x06 | CH #5 | 0 | CH #5 | 0x40 | CH #5 | 0x04 |
| CH #6 | 0x03 | 0x04 | 0x06 | 0x17 | CH #6 | 0 | CH #6 | 0x40 | CH #6 | 0x05 |
| CH #7 | 0x04 | 0x05 | 0x17 | 0x00 | CH #7 | 0 | CH #7 | 0x40 | CH #7 | 0x06 |
| CH #8 | 0x10 | 0x12 | 0x09 | 0x0a | CH #8 | 1 | CH #8 | 0x41 | CH #8 | 0x00 |
| CH #9 | 0x08 | 0x0c | 0x0c | 0x08 | CH #9 | 1 | CH #9 | 0x00 | CH #9 | 0x00 |
| CH #10 | 0x12 | 0x07 | 0x0a | 0x0b | CH #10 | 0 | CH #10 | 0x41 | CH #10 | 0x01 |
| CH #11 | 0x07 | 0x09 | 0x0b | 0x0d | CH #11 | 0 | CH #11 | 0x41 | CH #11 | 0x02 |
| CH #12 | 0x09 | 0x0a | 0x0d | 0x0e | CH #12 | 0 | CH #12 | 0x41 | CH #12 | 0x03 |
| CH #13 | 0x0c | 0x08 | 0x08 | 0x0c | CH #13 | 0 | CH #13 | 0x00 | CH #13 | 0x01 |
| CH #14 | 0x0a | 0x0b | 0x0e | 0x10 | CH #14 | 0 | CH #14 | 0x41 | CH #14 | 0x04 |
| CH #15 | 0x0b | 0x0d | 0x10 | 0x12 | CH #15 | 0 | CH #15 | 0x41 | CH #15 | 0x05 |
| CH #16 | 0x0f | 0x11 | 0x11 | 0x0f | CH #16 | 1 | CH #16 | 0x01 | CH #16 | 0x00 |
| CH #17 | 0x0d | 0x0e | 0x12 | 0x07 | CH #17 | 0 | CH #17 | 0x41 | CH #17 | 0x06 |
| CH #18 | 0x11 | 0x0f | 0x0f | 0x11 | CH #18 | 0 | CH #18 | 0x01 | CH #18 | 0x01 |
| CH #19 | 0x0e | 0x10 | 0x07 | 0x09 | CH #19 | 0 | CH #19 | 0x41 | CH #19 | 0x07 |
| CH #20 | 0x13 | 0x14 | 0x14 | 0x13 | CH #20 | 1 | CH #20 | 0x02 | CH #20 | 0x00 |
| CH #21 | 0x14 | 0x13 | 0x13 | 0x14 | CH #21 | 0 | CH #21 | 0x02 | CH #21 | 0x01 |
| CH #22 | 0x15 | 0x16 | 0x16 | 0x15 | CH #22 | 1 | CH #22 | 0x03 | CH #22 | 0x00 |
| CH #23 | 0x16 | 0x15 | 0x15 | 0x16 | CH #23 | 0 | CH #23 | 0x03 | CH #23 | 0x01 |
| CH #24 | 0x05 | 0x06 | 0x00 | 0x01 | CH #24 | 0 | CH #24 | 0x40 | CH #24 | 0x07 |
| CH #25 | 0x1e | 0x1f | 0x19 | 0x1a | CH #25 | 1 | CH #25 | 0x42 | CH #25 | 0x00 |
| CH #26 | 0x1f | 0x18 | 0x1a | 0x1b | CH #26 | 0 | CH #26 | 0x42 | CH #26 | 0x01 |
| CH #27 | 0x18 | 0x19 | 0x1b | 0x1c | CH #27 | 0 | CH #27 | 0x42 | CH #27 | 0x02 |
| CH #28 | 0x19 | 0x1a | 0x1c | 0x1d | CH #28 | 0 | CH #28 | 0x42 | CH #28 | 0x03 |
| CH #29 | 0x1a | 0x1b | 0x1d | 0x1e | CH #29 | 0 | CH #29 | 0x42 | CH #29 | 0x04 |
| CH #30 | 0x1c | 0x1c | 0x1e | 0x1f | CH #30 | 0 | CH #30 | 0x42 | CH #30 | 0x05 |
| CH #31 | 0x1c | 0x1d | 0x1f | 0x18 | CH #31 | 0 | CH #31 | 0x42 | CH #31 | 0x06 |
| CH #32 | 0x1d | 0x1e | 0x18 | 0x19 | CH #32 | 0 | CH #32 | 0x42 | CH #32 | 0x07 |

FIG.21A

| CH | FORMAT (7:6) | TS COMBI-NATION (5:0) |
|---|---|---|
| CH #1 | "01" | 0x00 |
| CH #2 | "01" | 0x00 |
| CH #3 | "01" | 0x00 |
| CH #4 | "01" | 0x00 |
| CH #5 | "01" | 0x00 |
| CH #6 | "01" | 0x00 |
| CH #7 | "01" | 0x00 |
| CH #8 | "01" | 0x01 |
| CH #9 | "00" | 0x00 |
| CH #10 | "01" | 0x01 |
| CH #11 | "01" | 0x01 |
| CH #12 | "01" | 0x01 |
| CH #13 | "00" | 0x00 |
| CH #14 | "01" | 0x01 |
| CH #15 | "01" | 0x01 |
| CH #16 | "00" | 0x01 |
| CH #17 | "01" | 0x01 |
| CH #18 | "00" | 0x01 |
| CH #19 | "01" | 0x01 |
| CH #20 | "00" | 0x02 |
| CH #21 | "00" | 0x02 |
| CH #22 | "00" | 0x03 |
| CH #23 | "00" | 0x03 |
| CH #24 | "01" | 0x00 |
| CH #25 | "01" | 0x02 |
| CH #26 | "01" | 0x02 |
| CH #27 | "01" | 0x02 |
| CH #28 | "01" | 0x02 |
| CH #29 | "01" | 0x02 |
| CH #30 | "01" | 0x02 |
| CH #31 | "01" | 0x02 |
| CH #32 | "01" | 0x02 |

FIG.21B

|  | OWN NUMBER | JC=+2 (19:15) | JC=+1 (14:10) | JC=-1 (9:5) | JC=-2 (4:0) |
|---|---|---|---|---|---|
| CH #1 | 0x00 | 0x07 | 0x06 | 0x01 | 0x02 |
| CH #2 | 0x01 | 0x00 | 0x07 | 0x02 | 0x03 |
| CH #3 | 0x02 | 0x01 | 0x00 | 0x03 | 0x04 |
| CH #4 | 0x03 | 0x02 | 0x01 | 0x04 | 0x05 |
| CH #5 | 0x04 | 0x03 | 0x02 | 0x05 | 0x06 |
| CH #6 | 0x05 | 0x04 | 0x03 | 0x06 | 0x07 |
| CH #7 | 0x06 | 0x05 | 0x04 | 0x07 | 0x00 |
| CH #8 | 0x07 | 0x06 | 0x05 | 0x00 | 0x01 |

FIG.22

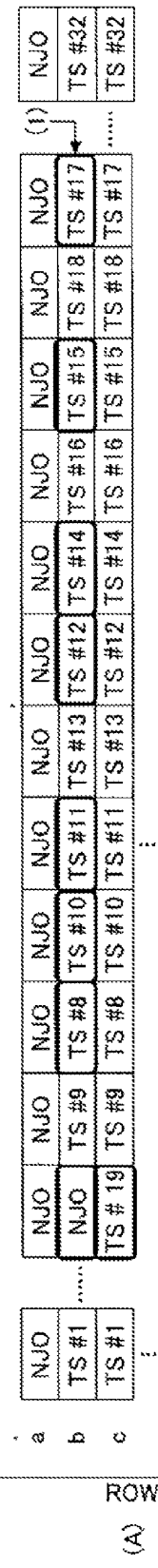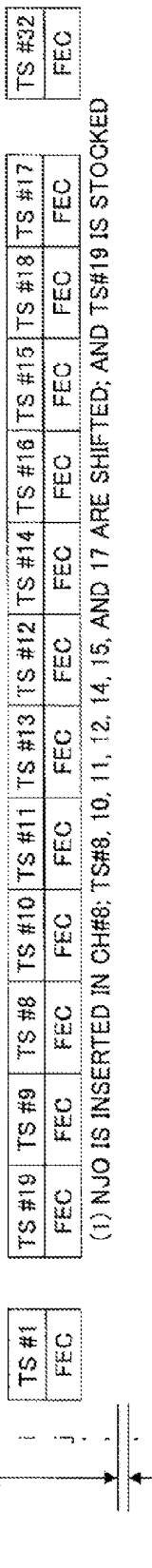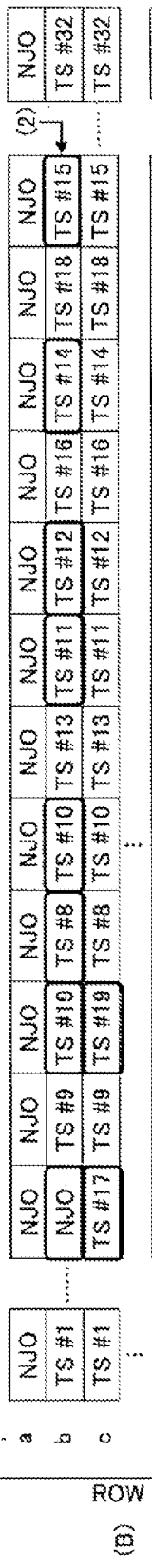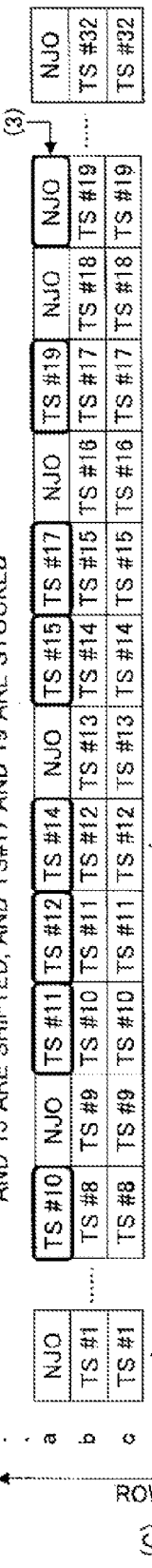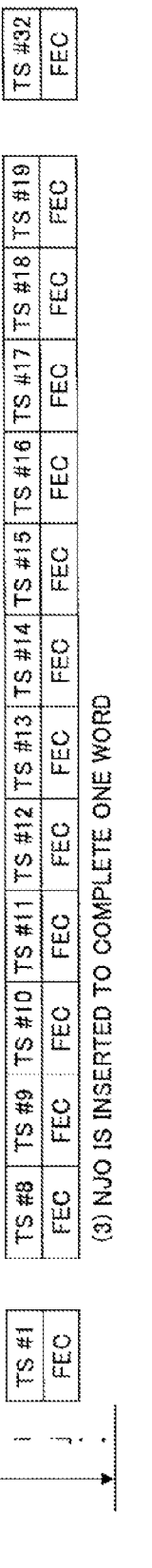
FIG.23

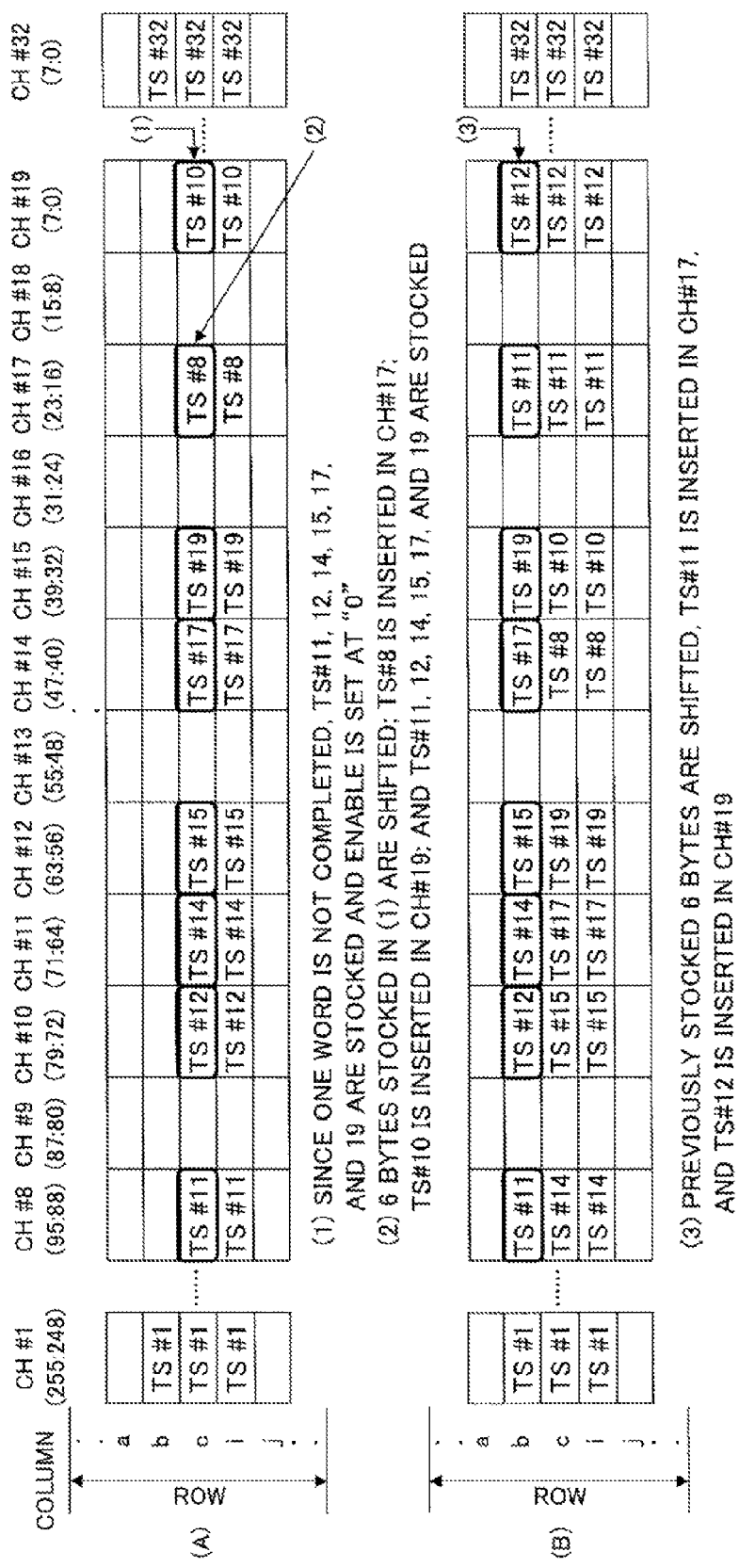

FRAME MAPPING APPARATUS AND FRAME MAPPING METHOD

CROSS-REFERENCE TO RELATED APPLICATION

This application is based upon and claims the benefit of priority of Japanese Patent Application No. 2011-073669 filed on Mar. 29, 2011, the entire contents of which are incorporated herein by reference.

FIELD

The embodiments discussed herein are related to a frame mapping apparatus and a frame mapping method.

BACKGROUND

The Optical Transport Network (OTN) has been recommended by International Telecommunication Union-Telecommunication Standardization Sector (ITU-T). The OTN employs wavelength division multiplexing (WDM) that can cope with an explosive increase in the Internet traffic and functions as a platform that makes lower layers transparent to upper layers in transmitting a client signal end to end. The OTN may be applied to synchronous networks such as the Synchronous Digital Hierarchy (SDH) and the Synchronous Optical Network (SONET) as well as to asynchronous networks such as an Internet protocol (IP) network and the Ethernet (registered trademark). Interfaces and frame formats of the OTN have been standardized by the ITU-T recommendation G.709 and the application of the OTN to commercial systems has been rapidly increasing.

Multiplexing and demultiplexing of signal transmission frames (may be called lower-speed signal transmission frames) such as optical channel data units "j" (ODUj) with a lower signal rate (e.g., bit rate) and signal transmission frames (may be called higher-speed signal transmission frames) such as optical channel data units "k" (ODUk) with a signal rate (e.g., bit rate) higher than that of the ODUj in a network employing interfaces conforming to the ITU-T recommendation G. 709 are discussed below.

Here, an ODU frame containing a client signal of, for example, the Ethernet (registered trademark) is called a lower order ODU (LO_ODU) and an ODU frame containing multiple lower-speed ODU frames is called a higher order ODU (HO_ODU). Accordingly, multiple lower-speed ODUj (e.g., ODU1) frames are multiplexed in a higher-speed HO_ODUk frame (e.g., ODU2, ODU3, or ODU4). Lower-speed ODUj frames are not limited to LO_ODUj frames. That is, HO_ODUj frames may also be multiplexed in an HO_ODUk frame.

FIG. 1 illustrates an OTUk frame format. An OTN frame may include an overhead, an optical channel payload unit k (OPUk, k is zero or a positive integer), and an optical channel transport unit k forward error correction (OTUk FEC).

The overhead is composed of first through sixteenth columns and four rows and has a size of 16 bytes×4. The overhead includes a frame alignment (FA) overhead, an OTUk overhead, an ODUk overhead, and an OPUk overhead, and is used for connection and quality management. The OPUk payload is composed of 17th through 3824th columns and 4 rows, and has a size of 3824 bytes×4. The OTUk FEC is composed of 3825th through 4080th columns and 4 rows, has a size of 256 bytes×4, and is used to correct an error caused during transmission.

The FA overhead includes a frame alignment signal (FAS) that is a fixed frame pattern of six bytes and a multiframe alignment signal (MFAS) that is a sequence number of one byte.

When ODUj frames are multiplexed in an HO_ODUk frame, an OPUk payload area of the HO_ODUk frame is divided into ts time slots called tributary slots (TS) in units of bytes, and an ODUj frame (s) is placed in each TS of the OPUk payload area.

In the ITU-T recommendation G.709, two types of tributary slots with different bit rates (or granularities) are defined: a tributary slot with a bit rate of about 1.25 Gbps and a tributary slot with a bit rate of about 2.5 Gbps (hereafter called a 1.25 Gbps tributary slot and a 2.5 Gbps tributary slot). In the case of the 1.25 Gbps tributary slot, the numbers of tributary slots ts are defined as illustrated in FIG. 2: ts=2 for HO_ODU1, ts=8 for HO_ODU2, ts=32 for HO_ODU3, and ts=80 for HO_ODU4.

In the case of the 2.5 Gbps tributary slot, the numbers of tributary slots ts are defined as illustrated in FIG. 3: ts=4 for HO_ODU2 and ts=16 for HO_ODU3. In FIGS. 2 and 3, TS #i (i=1-80) indicates a tributary slot number, OH stands for overhead, FS stands for fixed stuff, and FEC stands for forward error correction. OH, FS, and FEC are also stored in tributary slots.

FIG. 4 illustrates exemplary mapping of an ODU0 frame and an ODU1 frame to an OPU2 frame. In the example of FIG. 4, the ODU0 frame is mapped to TS #1 in the payload area of the OPU2 frame and the ODU1 frame is mapped to TS #4 and TS #8 in the payload area of the OPU2 frame. In this case, the number of tributary slots M that the ODU1 occupies in the payload area of the HO_ODU2 frame is two.

An exemplary process of multiplexing ODUj frames in an HO_ODUk frame is described below.

(1) According to the combination of the ODUj frames, the HO_ODUk frame, and the tributary slot bit rate, one of the following two procedures is selected as a multiplexing/demultiplexing scheme: an asynchronous mapping procedure (AMP) and a generalized mapping procedure (GMT).

(2) The number of tributary slots M and the positions of the tributary slots occupied by each ODUj frame in the payload area (OPUk) of the HO_ODUk frame are determined according to the bit rate of the ODUj frame.

(3) The ODUj frame is placed in M tributary slots of the HO_ODUk frame while stuffing the HO_ODUk frame by inserting null data based on the difference between the sum of bit rates of the M tributary slots and the bit rate of the ODUj frame according to the AMP or the GMP.

The AMP and the GMP employ different frequency justification schemes. The GMP is a new method introduced when the ITU-T recommendation G.709 was revised in December 2009. In the AMP, multiplexing/demultiplexing is performed while absorbing the frequency difference and the frequency deviation between tributary slots of the ODUj frame and the HO_ODUk frame by stuffing the HO_ODUk frame in units of bytes (−1 through +2 bytes). In the GMP, multiplexing/demultiplexing is performed while absorbing the frequency difference and the frequency deviation between tributary slots of the ODUj frame and the HO_ODUk frame by stuffing the HO_ODUk frame in units of M bytes. Here, M corresponds to the number of tributary slots of the HO_ODUk frame that are occupied by the ODUj frame. Before the revision of the ITU-T recommendation G.709 (i.e., before December 2009), only the AMP was being used for multiplexing/demultiplexing of signal frames. Currently, multiplexing/demultiplexing of signal frames needs to be performed in an environment where both the AMP and the GMP are used.

In the AMP, as illustrated in FIG. 1, three justification control (JC) bytes and a negative justification opportunity (NJO) byte in the OPUk overhead and positive justification opportunity (PJO) bytes in the OPUk payload are used. Data or stuff bytes (zeros) are inserted in the NJO byte and the PUG bytes based on JC byte information (or frequency justification information) represented by the JC bytes. Thus, in the AMP, stuff positions where stuff bytes are inserted are fixed.

In GMP, stuff bytes are inserted in the OPUk payload according to JC byte information represented by six JC bytes in the OPUk overhead. Thus, in the GMP, stuff positions are changed according to the stuffing amount, and stuffing is performed based on the JC byte information in the previous (multi-)frame.

FIG. 5 is a drawing illustrating an exemplary configuration of an OTN_ADM (add drop multiplexer) cross connect apparatus. FIG. 6 is a drawing illustrating an exemplary configuration of an OTN_ADM multiplexing apparatus. In FIG. 5, an HO_OTUk optical signal input from an optical network to an HO interface 11/12 (i.e., one of the HO interfaces 11 and 12) is terminated by a demapping unit (OTUk DMAP) 13 of the HO interface 11/12 and an HO_ODUk signal is extracted. The HO_ODUk signal is separated (or demultiplexed) into HO_ODUj signals or LO_ODUj signals by a demultiplexer (OTUk DMUX) 14. The HO_ODUj signals are cross-connected by a cross connect unit 20 and supplied to a multiplexer (HO_ODUk MUX) 15 of the opposing HO interface 12/11 (i.e., the other one of the HO interfaces 11 and 12). Meanwhile, the LO_ODUj signals are cross-connected by the cross connect unit 20 and supplied to demapping units (LO_ODUj DMAP) 22 of an LO interface 21.

The demapping units (LO_ODUj DMAP) 22 of the LO interface 21 demap client signals from the LO_ODUj signals. The client signals are output to a client network via a client interface 23. Meanwhile, client signals input from the client network are received by a client interface 24 and mapped to LO_ODUj signals by mapping units (LO_ODUj MAP) 25. The LO_ODUj signals are cross-connected by the cross connect unit 20 and supplied to the multiplexer 15 of the HO interface 11/12.

The multiplexer 15 of the HO interface 11/12 multiplexes the supplied HO_ODUj signals and LO_ODUj signals and thereby maps them to an HO_ODUk signal. The HO_ODUk signal is mapped by an OTUk mapping unit (OTUk MAP) 16 to an OTUk signal and the OTUk signal is output to the optical network.

The OTN_ADM multiplexing apparatus of FIG. 6 has a configuration similar to that of the OTN_ADM cross connect apparatus of FIG. 5 except that the OTN_ADM multiplexing apparatus does not include the cross connect unit 20. In FIGS. 5 and 6, the same reference numbers are assigned to the corresponding components.

FIG. 7 illustrates intermediate frames and mapping types used to multiplex LO_ODUj signals in an HO_ODUk signal by the multiplexer 15. FIG. 8 illustrates intermediate frames and mapping types used to multiplex HO_ODUj signals in an HO_ODUk signal by the multiplexer 15. In the "intermediate frame" column, "ODTUG1" indicates ODTU group 1, payload type (PT)=20 indicates a frame where only the AMP is used for mapping, and PT=21 indicates a frame where either AMP or GMP can be used for mapping. As illustrated in FIGS. 7 and 8, different intermediate frames are used for different types of input signals. Therefore, in the related art, mapping and multiplexing circuits are provided separately for the respective types of input signals.

FIG. 9A illustrates a structure of an intermediate frame ODTUjk for the AMP where tributary slots in the OPUk payload area are multiplexed in units of bytes. When the bit rate of one tributary slot is 1.25 Gbps and jk=01, the ODTUjk overhead is 4×ts bytes. Also, when jk=01, the ODTUjk payload is 15232×ts bytes. The numbers of columns and rows of the ODTUjk payload and the value of ts are defined by a table of FIG. 9B when the bit rate of one TS is 2.5 Gbps and defined by a table of FIG. 9C when the bit rate of one TS is 1.25 Gbps.

FIG. 10A illustrates a structure of an intermediate frame ODTUk.ts for the GMP where tributary slots in the OPUk payload area are multiplexed in units of bytes. When k=2, 3, or 4, the ODTUk.ts overhead is 6×ts bytes. Also, the ODTUk.ts payload is 15232×ts bytes when k=2 or 3 and is 15200×ts bytes when k=4. The numbers of columns and rows of the ODTUk.ts payload are defined by a table of FIG. 10B.

Meanwhile, Japanese Laid-Open Patent Publication No. 2004-523959, for example, discloses a method of transferring SDH/SONET/OTN frames via an intermediate network. In the disclosed method, contents of an entity are mapped to subframes, the subframes are virtually combined using sequence indicators assigned to the subframes and transferred via the intermediate network, and the subframes are assembled into the original entity at a remote node.

Also, WO2008/035769, for example, discloses an OTN multiplex transmission method that makes it possible to improve the multiplexing efficiency. In the disclosed OTN multiplex transmission method, management overheads are attached to CT signals, multiple CT signals whose bit rates are different from each other and are not integral multiples or divisions of each other are multiplexed, and some or all of the bit rates of the CT signals are adjusted such that the bit rates become integral, multiples or divisions of each other.

FIG. 11 illustrates an exemplary configuration of a related-art multiplexing and mapping unit that multiplexes four ODU2 frames in an ODU3 (OTU3) frame. In this configuration, four sets of a clock conversion buffer 31, an intermediate (ODTU23) framing unit 32, and a JC determination unit 33 are provided for the corresponding ODU2 frames, and the four sets operate independently of each other. After the four sets of the clock conversion buffer 31, the intermediate (ODTU23) framing unit 32, and the JC determination unit 33, a port switch 34, a slot switch 35, and an OTU3 framing unit 36 are provided.

FIG. 12 illustrates an exemplary configuration of a related-art multiplexing and mapping unit that multiplexes ODU2 and ODU1 frames in an ODU3 (OTU3) frame. With this configuration, up to four channels (CM) of ODU2 frames or up to 16 channels of ODU1 frames can be multiplexed in an ODU3 frame. To flexibly multiplex ODU2 and ODU1 frames, multiple sets of a buffer 31, an intermediate (ODTU13, ODTU23) framing unit 32, and a JC determination unit 33 are provided for the number of channels (or frames) in each of an ODTU23 block 37 and an ODTU13 block 38.

With the related-art configuration, however, when multiplexing, for example, one channel of the ODU2 frame and 12 channels of the ODU1 frames in an ODU3 frame, three sets of the buffer 31, the intermediate framing unit 32, and the JC determination unit 33 in the ODTU23 block 37 and four sets of the buffer 31, the intermediate framing unit 32, and the JC determination unit 33 in the ODTU13 block 38 are not used. Thus, the related-art configuration is redundant and unnecessarily increases the circuit size.

FIG. 13 illustrates an exemplary configuration of a related-art multiplexing and mapping unit that multiplexes ODU2, ODU1, and ODU0 frames in an ODU3 (OTU3) frame. With this configuration, up to four channels of ODU2 frames, up to 16 channels of ODU1 frames, or up to 32 channels of ODU0 frames can be multiplexed in an ODU3 frame. To flexibly multiplex ODU2, ODU1, and ODU0 frames, multiple sets of a buffer 31, an intermediate (ODTU03, ODTU13, ODTU23) framing unit 32, and a JC determination unit 33 are provided for the number of channels (or frames) in each of an ODTU23 block 37, an ODTU13 block 38, and an ODTU03 block 39. Similarly to the configuration of FIG. 12, not all of the sets of the buffer 31, the intermediate framing unit 32, and the JC determination unit 33 in the ODTU23 block 37, the ODTU13 block 38, and the ODTU03 block 39 are always used. Accordingly, the configuration of FIG. 13 is also redundant and unnecessarily increases the circuit size.

As described above, with related-art configurations, the circuit size (or the number of circuits) of a multiplexing unit (and/or a mapping unit) drastically increases as the types of input ODUj frames increase. In ITU-T G.709, as illustrated in FIGS. 7 and 8, multiplexing of various types of ODUj frames is standardized. Therefore, an GIN transmission apparatus needs to support multiplexing of various types of ODUj frames. However, this may increase the circuit size of the GIN transmission apparatus.

SUMMARY

According to an aspect of the invention, there is provided an apparatus for mapping multiple lower-speed signal transmission frames to a higher-speed signal transmission frame. The apparatus includes buffers configured to buffer the lower-speed signal transmission frames, determination units configured to determine frequency justification information for the lower-speed signal transmission frames, a barrel shifter configured to receive signals output from the buffers, and a controller configured to control the barrel shifter to map the lower-speed signal transmission frames to the higher-speed signal transmission frame based on external settings for the respective lower-speed signal transmission frames and the frequency justification information determined by the determination units. When the minimum unit of the lower-speed signal transmission frames is a channel, the number of the buffers and the number of the determination units correspond to the maximum number of channels that can be multiplexed in the higher-speed signal transmission frame.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

BRIEF DESCRIPTION OF DRAWINGS

FIG. 1 is a drawing illustrating an OTUk frame format;
FIG. 2 is a drawing illustrating the numbers of tributary slots ts for HO_ODUk frames;
FIG. 3 is a drawing illustrating the numbers of tributary slots ts for HO_ODUk frames;
FIG. 7 is a table illustrating intermediate frames and mapping types used to multiplex LO_ODUj signals in an HO_ODUk signal;
FIG. 8 is a table illustrating intermediate frames and mapping types used to multiplex HO_ODUj signals in an HO_ODUk signal;
FIGS. 9A through 9C are drawings illustrating a structure of an intermediate frame ODTUjk;
FIGS. 10A and 10B are drawings illustrating a structure of an intermediate frame ODTUk.ts;
FIG. 14 is a drawing illustrating an exemplary configuration of a multiplexing and mapping circuit of an embodiment;
FIG. 15A is a drawing illustrating an exemplary arrangement of tributary slots in an OPU3 frame;
FIG. 15B is a drawing illustrating exemplary ts values corresponding to MFAS in an OPU3 frame;
FIG. 20 is a drawing illustrating exemplary external settings;
FIGS. 21A and 21B are drawings illustrating exemplary external settings;
FIG. 22 is a drawing used to describe operations of a barrel shifter;
FIG. 23 is another drawing used to describe operations of a barrel shifter;
FIG. 27 is another drawing used to describe operations of a barrel shifter.

DESCRIPTION OF EMBODIMENTS

Preferred embodiments are described below with reference to the accompanying drawings.

<Multiplexing and Mapping Circuit>

Figure 4:
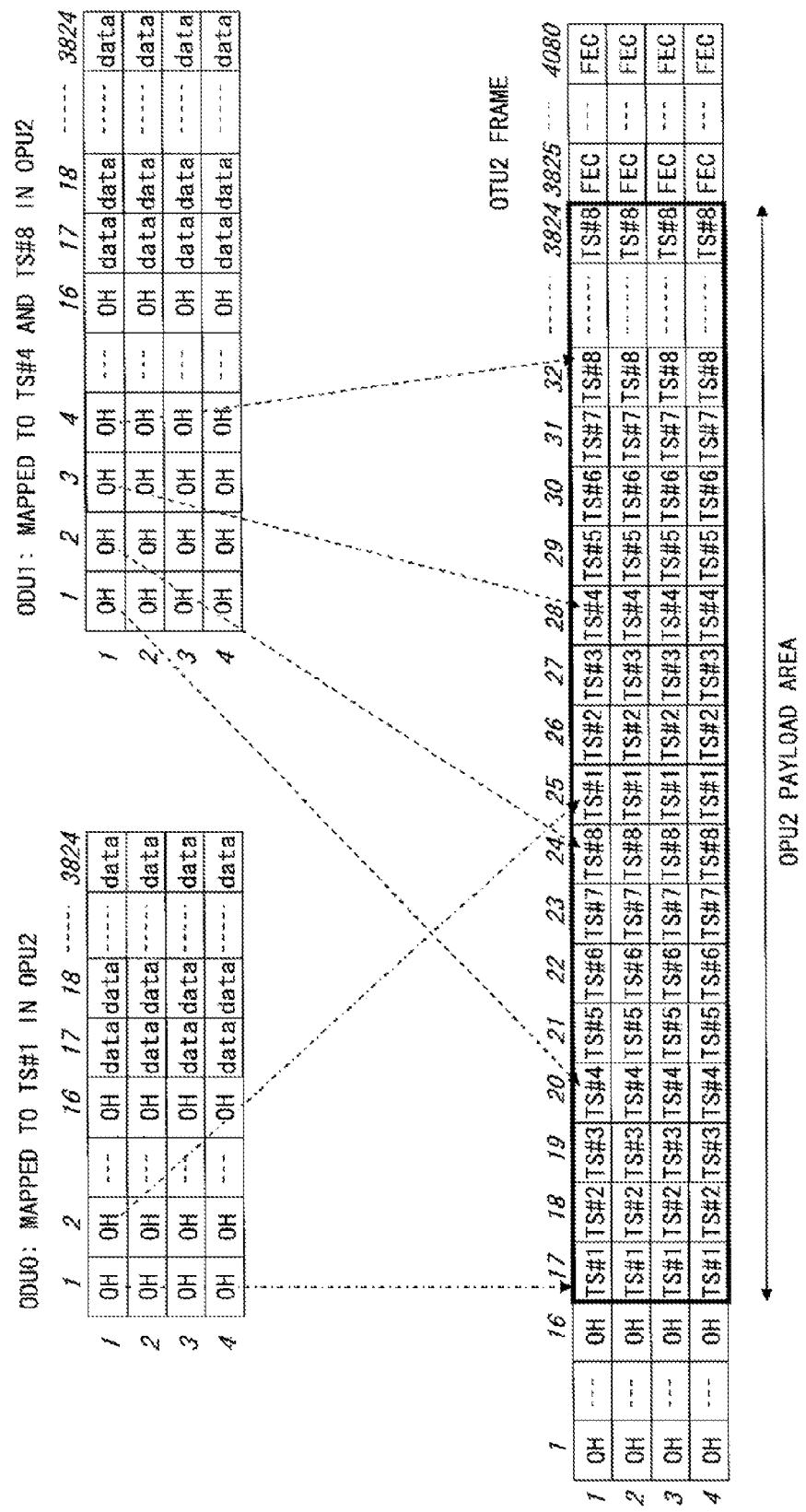
FIG. 4 is a drawing illustrating exemplary mapping of an ODU0 frame and an ODU1 frame to an OPU2 frame.
Figure 5:
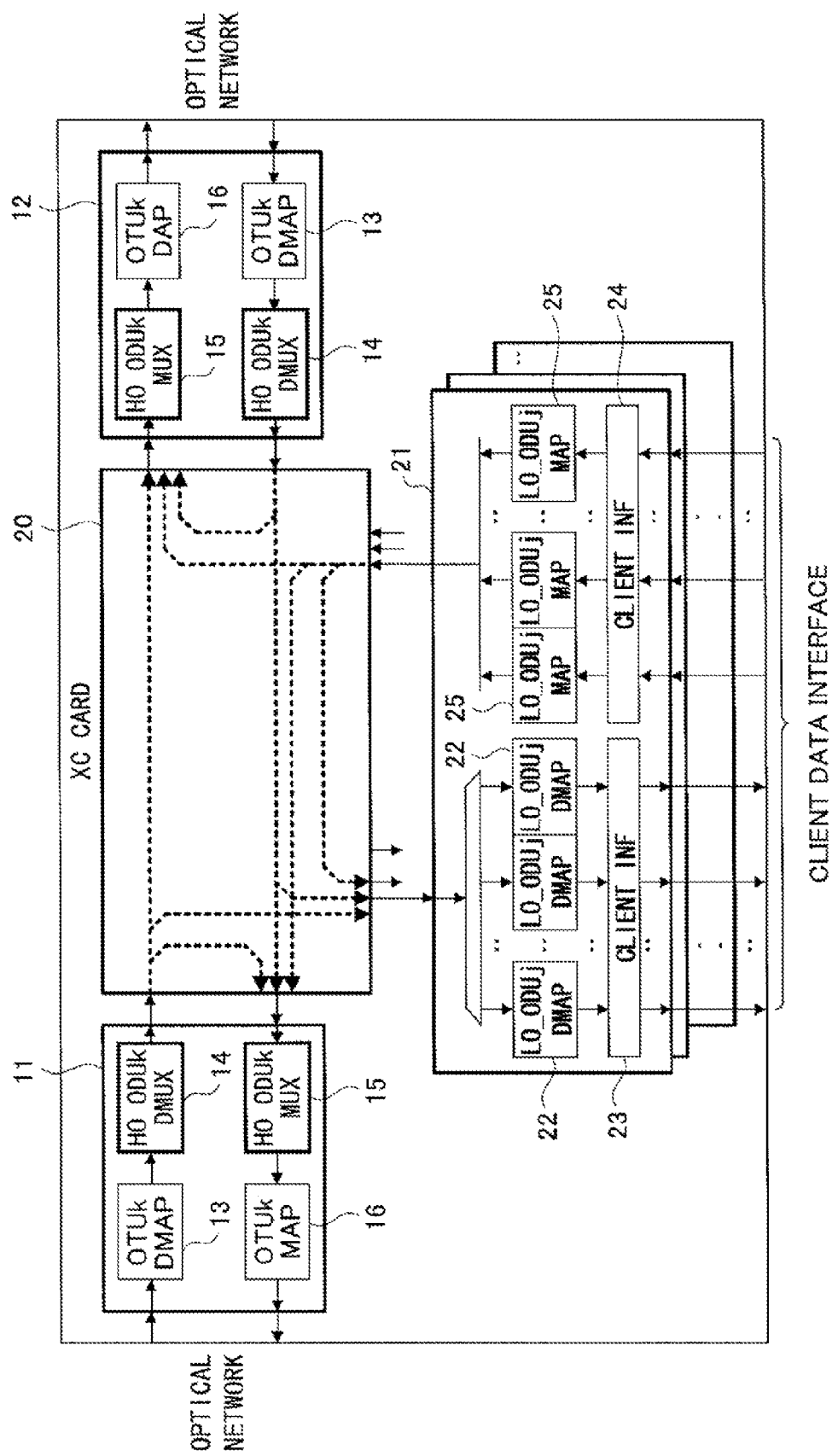
FIG. 5 is a drawing illustrating an exemplary configuration of a cross connect apparatus.
Figure 6:
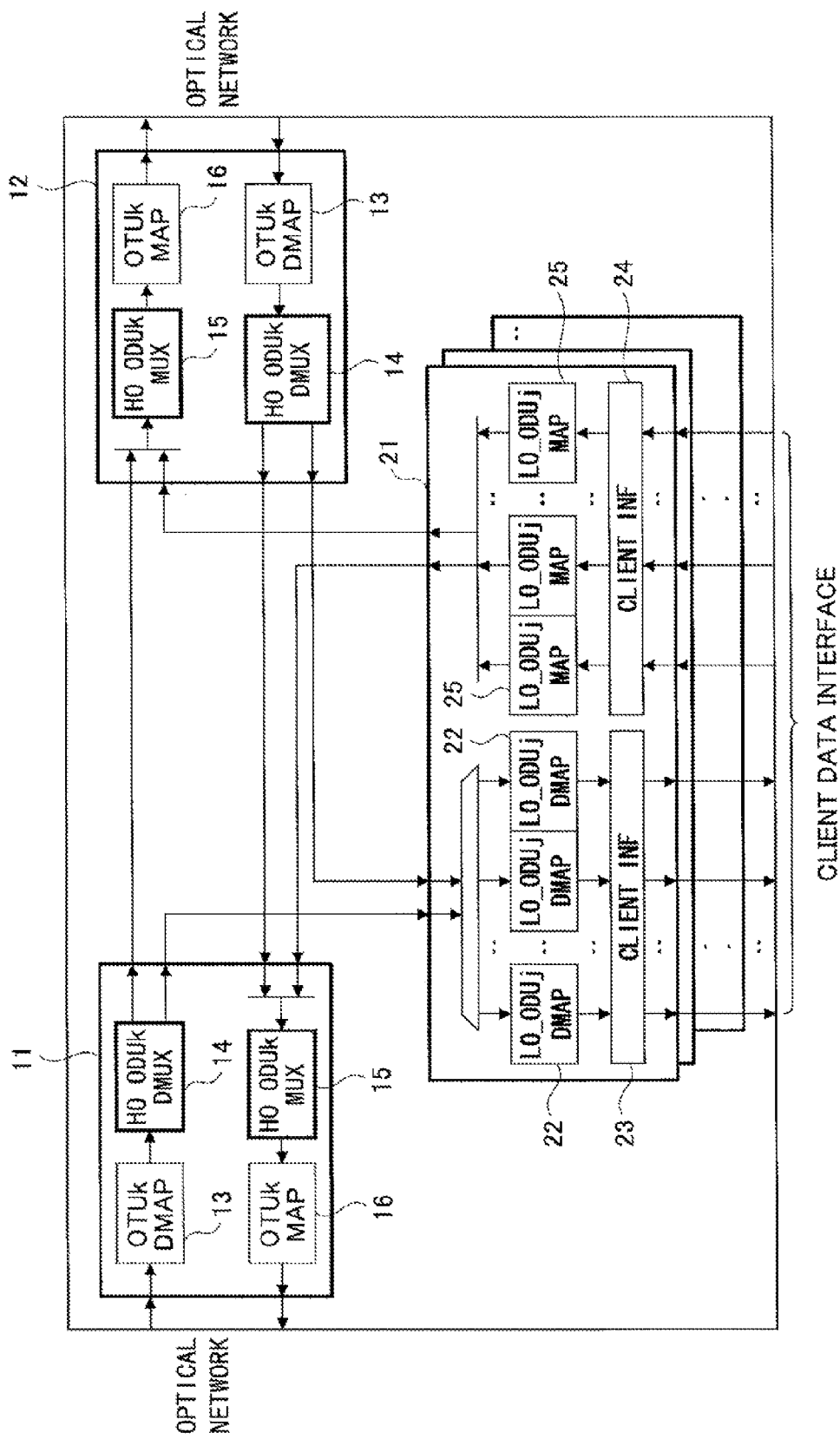
FIG. 6 is a drawing illustrating an exemplary configuration of a multiplexing apparatus.
Figure 11:
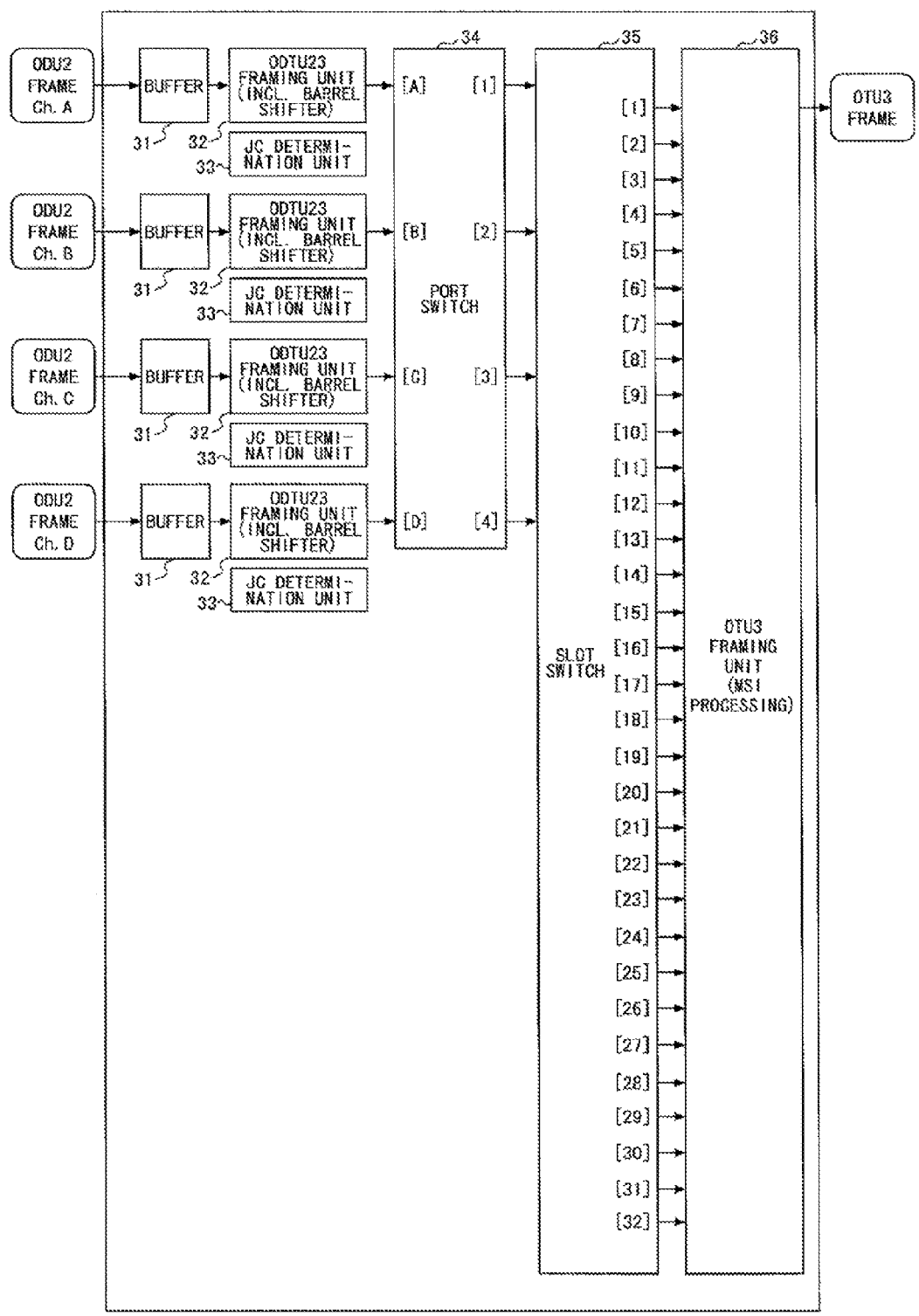
FIG. 11 is a drawing illustrating an exemplary configuration of a related-art multiplexing and mapping unit.
Figure 12:
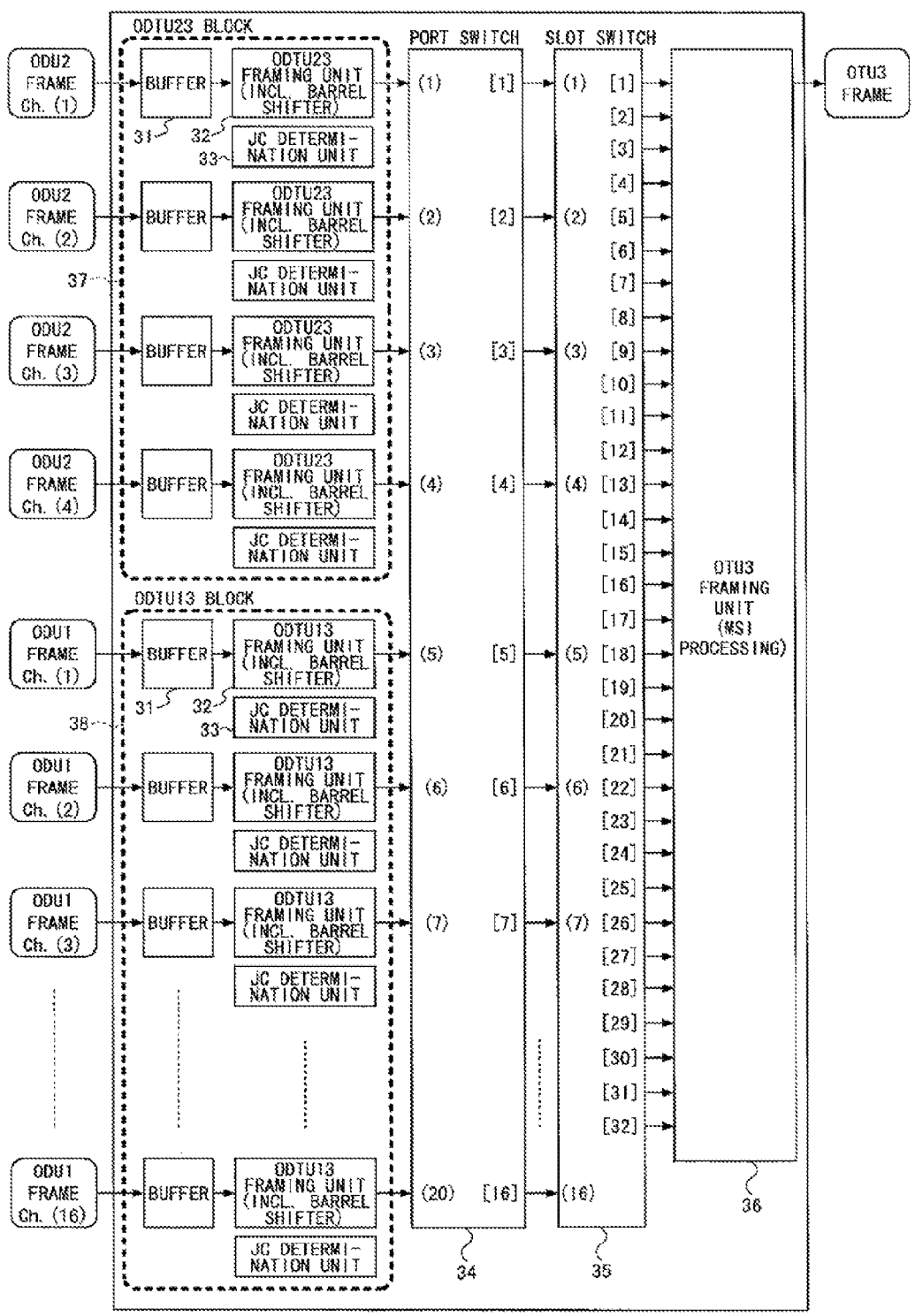
FIG. 12 is a drawing illustrating another exemplary configuration of a related-art multiplexing and mapping unit.
Figure 13:
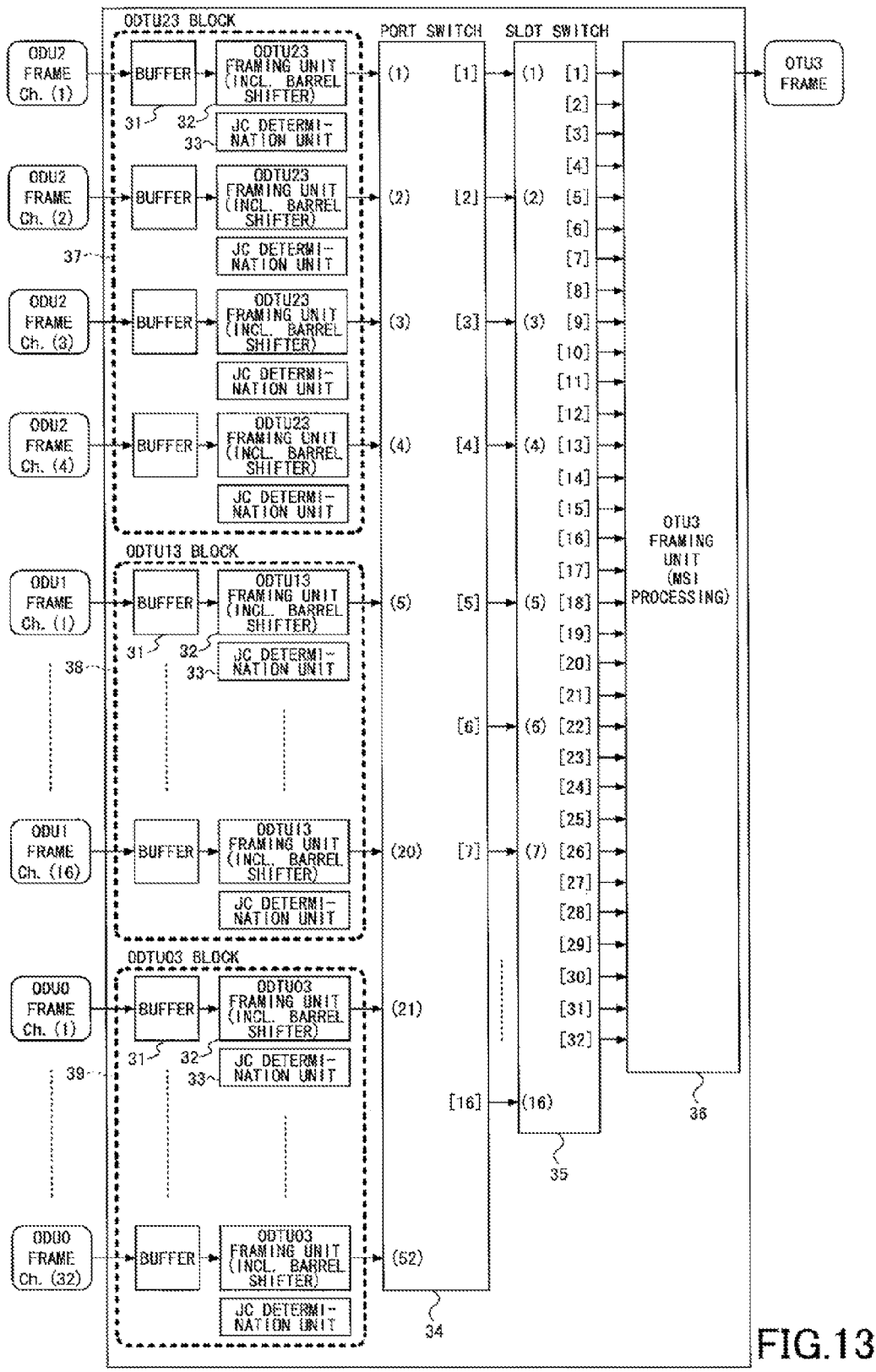
FIG. 13 is a drawing illustrating another exemplary configuration of a related-art multiplexing and mapping unit.

FIG. 14 is a drawing illustrating an exemplary configuration of a multiplexing and mapping circuit 40 of an embodiment. The multiplexing and mapping circuit 40 may correspond to the multiplexer 15 and the OTUk mapping unit 16 of the HO interface 11/12 illustrated in FIG. 5 or 6.

As illustrated in FIG. 14, the input side of the multiplexing and mapping circuit 40 has a configuration that is independent of frame types. In other words, assuming that one ODU0 frame, which is a minimum ODU frame, corresponds to one channel (CH), the multiplexing and mapping circuit 40 includes multiple sets of buffers and JC determination units that correspond to the maximum number of signal channels that can be multiplexed in an HO_ODUk frame to be output.

In FIG. 14, it is assumed that the multiplexing and mapping circuit 40 outputs an OTU3 frame that can accommodate up to 32 channels of ODU0 frames. Therefore, in this example, the multiplexing and mapping circuit 40 includes clock conversion buffers 41-1 through 41-32 and JC determination units 42-1 through 42-32 corresponding to 32 input channels.

The buffers 41-1 through 41-32 buffer 32 channels of input signals. The buffered signals are read from the buffers 41-1 through 41-32 according to the internal clock of the multiplexing and mapping circuit 40 for clock conversion, and are supplied to a barrel shifter 43. The JC determination units 42-1 through 42-32 determine JC byte information (frequency justification information) of the 32 channels of input signals and supply the JC byte information to a barrel shifter control unit 44. The barrel shifter control unit 44 may also be called a controller.

Here, with the GMP, since stuff bytes are inserted in the OPUk payload according to the JC byte information, the barrel shifter 43 does not need information on stuff positions. Meanwhile, with the AMP, since data are inserted in the NJO byte of the OPUk overhead and stuff bytes are inserted in the PJO1 and PJO2 bytes of the OPUk payload according to the JC byte information, the barrel shifter 43 needs information on stuff positions. For this reason, the JC determination units 42-1 through 42-3 determine JC byte information of the AMP and supply the JC byte information to the barrel shifter control unit 44. In other words, the JC determination units 42-1 through 42-3 determine JC byte information when the AMP is employed for mapping.

The barrel shifter 43 has a capability to process an OTU3 frame and includes functions to perform intermediate framing, port switching, and slot switching. External settings for the intermediate framing, the port switching, the slot switching, and concatenation groups are supplied from a CPU 47 via a CPU interface 45 to the barrel shifter control unit 44. Under the control of the barrel shifter control unit 44, the barrel shifter 43 performs the intermediate framing for each concatenation group based on the external settings and performs stuffing based on the JC byte information from the JC determination units 42-1 through 42-32. The barrel shifter 43 also performs the port switching and the slot switching to switch tributary slot numbers between 32 input ports and 32 output ports. Command signals for the port switching and the slot switching may also be supplied from an external device such as the CPU 47.

The barrel shifter 43 outputs 32 channels of signals to an OTU3 framing unit 46. The OTU3 framing unit 46 maps the 32 channels of signals to an OTU3 frame, adds overhead and FECs to the OTU3 frame, and outputs the OTU3 frame.

FIG. 15A is a drawing illustrating an exemplary arrangement of tributary slots in an OPU3 frame. FIG. 15A illustrates an OTU3 frame that is a multi-frame composed of 32 frames. Tributary slot numbers are written in 17th through 3824th columns of each ODU0 frame. When the bit rate of one tributary slot is 2.5 Gbps, ts values corresponding to MFAS bits are 1 through 16 as illustrated in the left side of FIG. 15B. When the bit rate of one tributary slot is 1.25 Gbps, ts values corresponding to MFAS bits are 1 through 32 as illustrated in the right side of FIG. 15E.

In the OPU3 frame illustrated in FIG. 15A, JC information of an ODUj frame multiplexed in the tributary slot number 1 is stored in the 15th and 16th columns of the overhead of the first frame, and JC information of an ODUj frame multiplexed in the tributary slot number "1" is stored in the 15th and 16th columns of the overhead of the "i"th frame.

Figure 16:
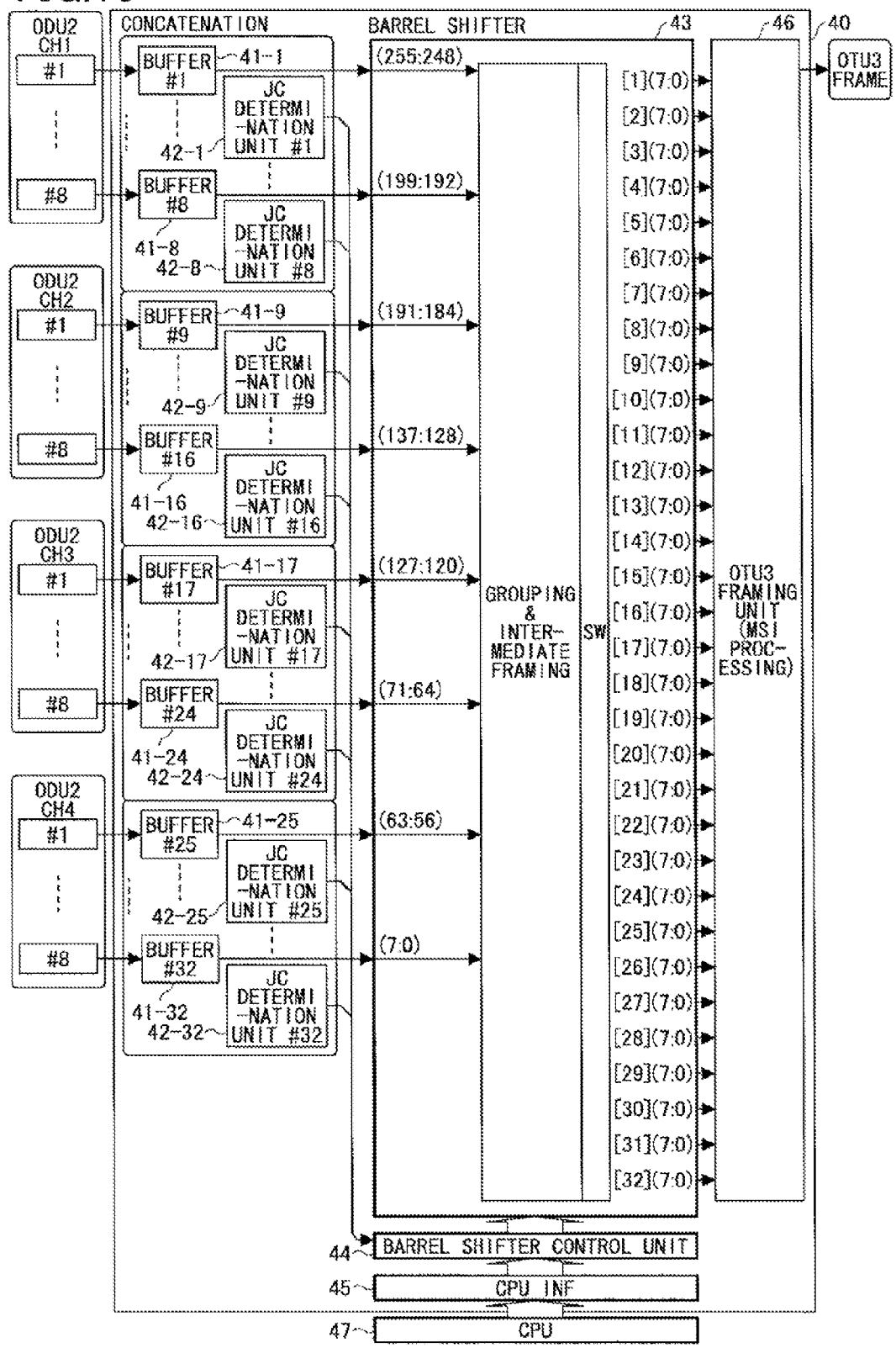
FIG. 16 is a drawing used to describe an exemplary case where ODU2 frames are multiplexed in an OTU3 frame by a multiplexing and mapping circuit.

FIG. 16 is a drawing used to describe an exemplary case where four channels of ODU2 frames are multiplexed in an OTU3 frame by the multiplexing and mapping circuit 40. One channel of an ODU2 frame has a capacity of eight channels of ODU0 frames. Therefore, eight channels of input signals in FIG. 14 are treated as a group (a concatenation group) and processed as one channel of an ODU2 frame (i.e., a concatenation process is performed for the group). For this purpose, eight buffers and eight JC determination units corresponding to the eight channels of input signals form a group and perform a concatenation process. For the concatenation process, a group setting (I_MSIDT) is supplied from the CPU 47 via the barrel shifter control unit 44 to the buffers 41-1 through 41-32 and the JC determination units 42-1 through 42-32.

In this example, the buffers 41-1 through 41-8 and the JC determination units 42-1 through 42-8 form a first group to perform a concatenation process, and the buffers 41-9 through 41-16 and the JC determination units 42-9 through 42-16 form a second group to perform a concatenation process. Similarly, the buffers 41-17 through 41-24 and the JC determination units 42-17 through 42-24 form a third group to perform a concatenation process, and the buffers 41-25 through 41-32 and the JC determination units 42-25 through 42-32 form a fourth group to perform a concatenation process.

Figure 17:
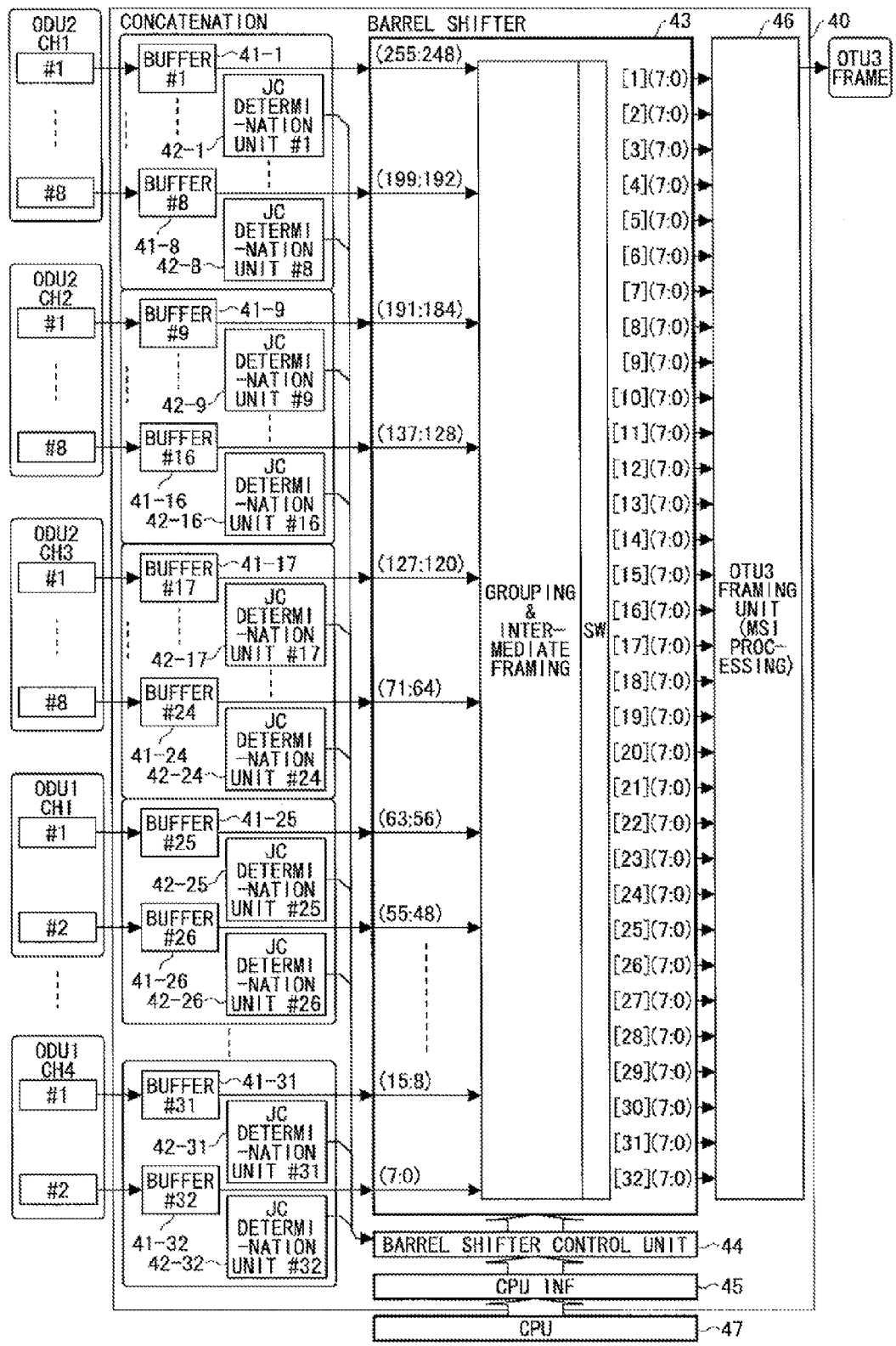
FIG. 17 is a drawing used to describe an exemplary case where ODU2 and ODU1 frames are multiplexed in an OTU3 frame by a multiplexing and mapping circuit.

FIG. 17 is a drawing used to describe an exemplary case where three channels of ODU2 frames and four channels of ODU1 frames are multiplexed in an OTU3 frame by the multiplexing and mapping circuit 40. One channel of an ODU2 frame has a capacity of eight channels of ODU0 frames, and one channel of an ODU1 frame has a capacity of two channels of ODU0 frames. Therefore, eight channels of input signals in FIG. 14 are treated as a group and processed as one channel of an ODU2 frame, and eight buffers and eight JC determination units corresponding to the eight channels of input signals form a group and perform a concatenation process. Also, two channels of input signals are treated as a group and processed as one channel of an ODU1 frame, and two buffers and two JC determination units corresponding to the two channels of input signals form a group and perform a concatenation process. For the concatenation process, a group setting (I_MSIDT) is supplied from the CPU 47 via the barrel shifter control unit 44 to the buffers 41-1 through 41-32 and the JC determination units 42-1 through 42-32.

In this example, the buffers 41-1 through 41-8 and the JC determination units 42-1 through 42-8 form a first group to perform a concatenation process, the buffers 41-9 through 41-16 and the JC determination units 42-9 through 42-16 form a second group to perform a concatenation process, and the buffers 41-17 through 41-24 and the JC determination units 42-17 through 42-24 form a third group to perform a concatenation process.

Meanwhile, the buffers 41-25 through 41-26 and the JC determination units 42-25 through 42-26 form a fourth group to perform a concatenation process, the buffers 41-27 through 41-28 and the JC determination units 42-27 through 42-28 form a fifth group to perform a concatenation process, the buffers 41-29 through 41-30 and the JC determination units 42-29 through 42-30 form a sixth group to perform a concatenation process, and the buffers 41-31 through 41-32 and the JC determination units 42-31 through 42-32 form a seventh group to perform a concatenation process.

Figure 18:
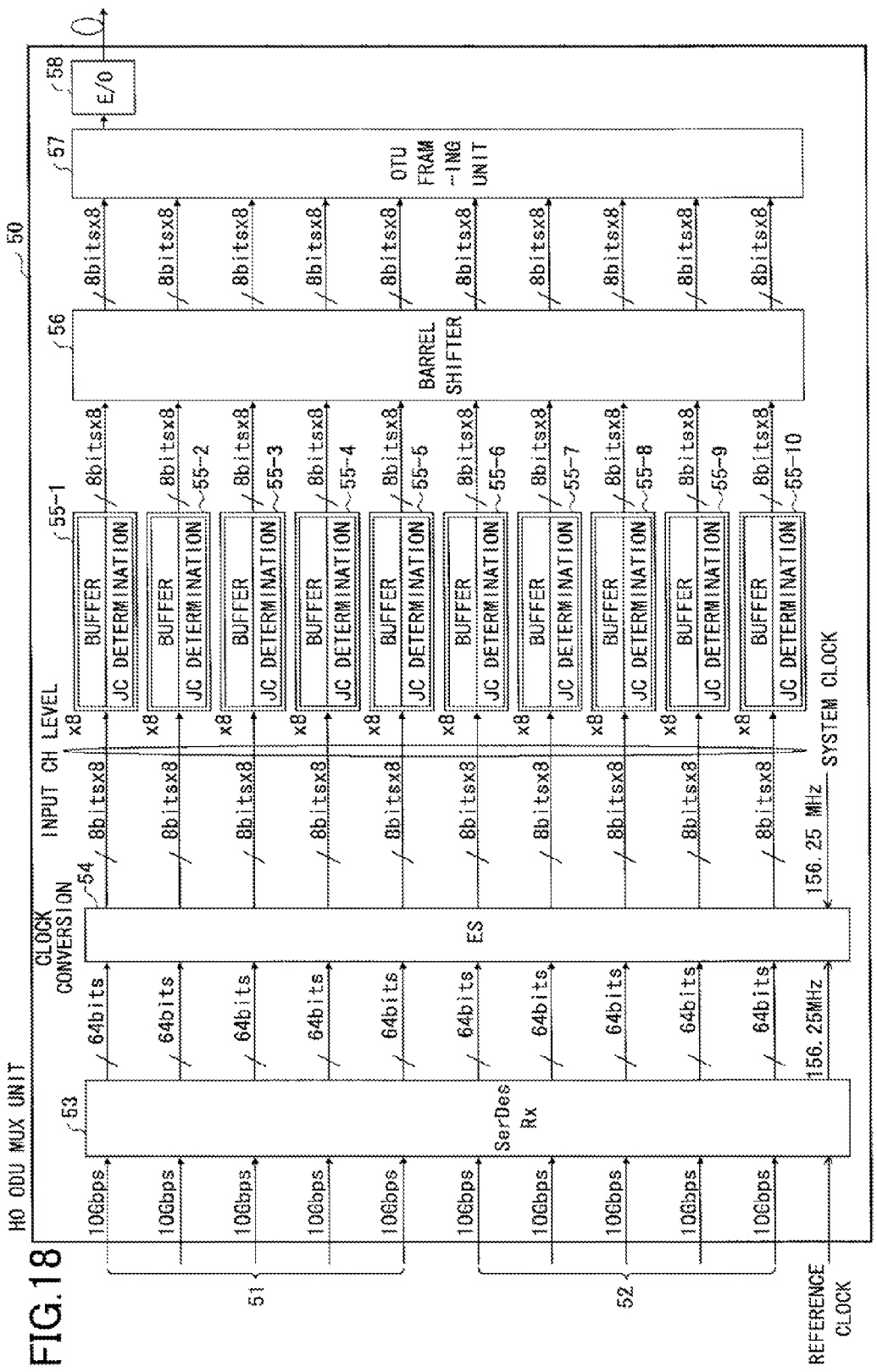
FIG. 18 is a drawing illustrating another exemplary configuration of a multiplexing and mapping circuit of an embodiment.

FIG. 18 is a drawing illustrating an exemplary configuration of a multiplexing and mapping circuit 50 of an embodiment. The multiplexing and mapping circuit 50 may correspond to the multiplexer 15 and the OTUk mapping unit 16 of the HO interface 11/12 illustrated in FIG. 5 or 6.

In FIG. 18, for example, five HO_ODUj signals are supplied from the opposing HO interface 12/11 (i.e., the other one of the HO interfaces 11 and 12) to input ports 51 of the multiplexing and mapping circuit 50, and five LO_ODUj signals are supplied from the LO interface 21 to input ports 52. The HO_ODUj signals and the LO_ODUj signals are converted into parallel, signals by a serial-parallel conversion unit (SerDes) 53 and supplied to a memory (ES) 54 to perform clock conversion on the parallel signals. The clock-converted signals are supplied to buffer and JC determination units 55-1 through 55-10. Each of the buffer and JC determination units 55-1 through 55-10 includes eight circuits each corresponding to a byte. The buffer and JC determination units 55-1 through 55-10 may correspond to the buffers 41-1 through 41-32 and the JC determination units 42-1 through 42-32 in FIG. 14.

Eight bytes of data read from the buffers of each of the buffer and JC determination units 55-1 through 55-10 are supplied to a barrel shifter 56. The barrel shifter 56 corresponds to the barrel shifter 43 in FIG. 14. The barrel shifter 56 performs intermediate framing for each concatenation group and also performs stuffing. The barrel shifter 43 also performs port switching and slot switching to switch tributary slot numbers between the input ports and the output ports.

Ten sets of 8-byte data output from the barrel shifter 56 are supplied to an OTU framing unit 57. The OTU framing unit 57 may correspond to the OTU3 framing unit 46 in FIG. 14. The OTU framing unit 57 maps the data to an OTU frame and adds overhead and FECs to the OTU frame. The OTU frame is converted by an electrical/optical converter (E/O) 58 into an optical signal and the optical signal is output from the multiplexing and mapping circuit 50.

<Configurations of Barrel Shifter and Barrel Shifter Control Unit>

Figure 19:
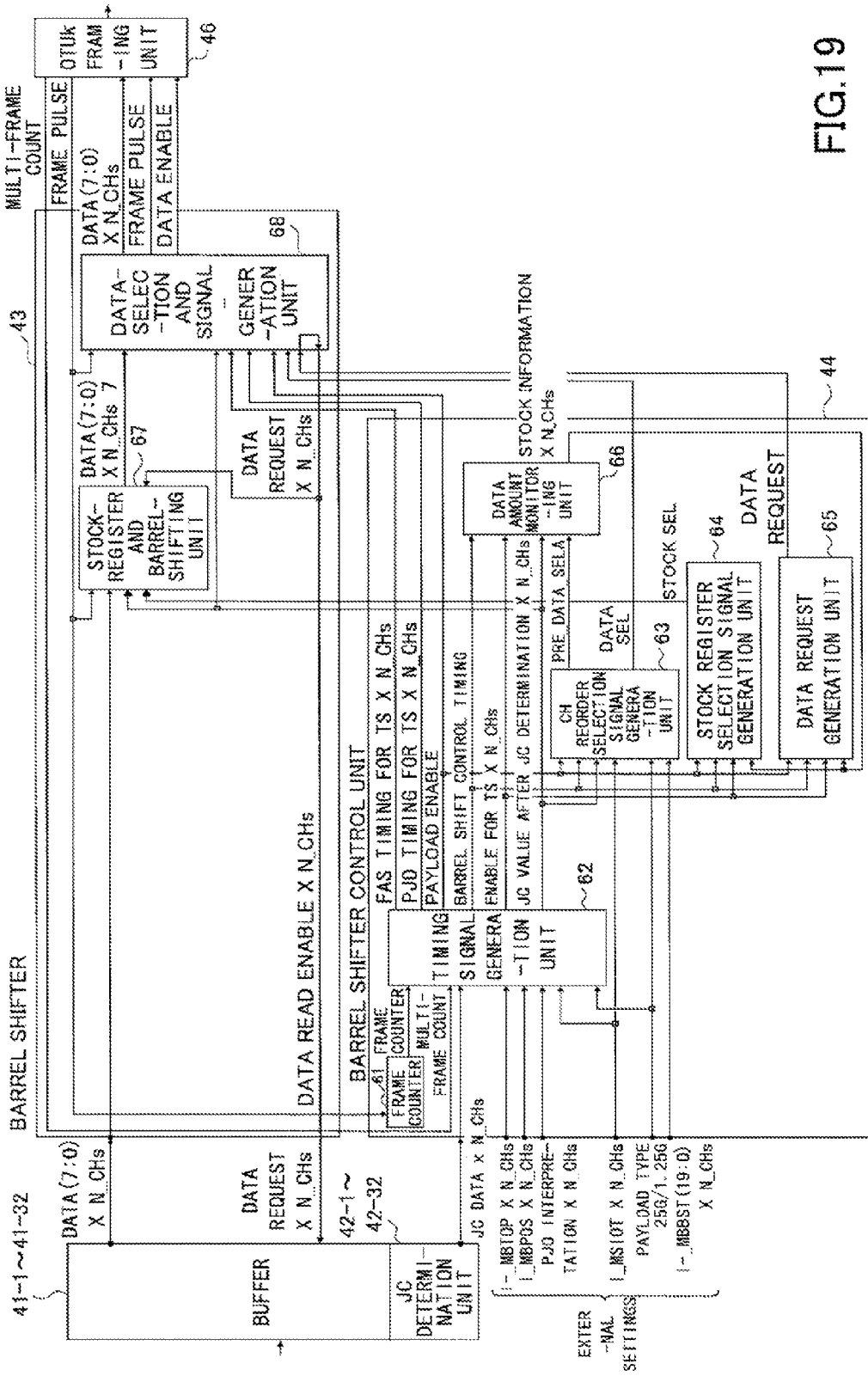
FIG. 19 is drawing illustrating exemplary configurations of a barrel shifter and a barrel shifter control unit according to an embodiment.

FIG. 19 is drawing illustrating exemplary configurations of the barrel shifter 43 and the barrel shifter control unit 44 according to an embodiment. As illustrated in FIG. 19, the barrel shifter control unit 44 may include a frame counter 61, a timing signal generation unit 62, a CH reorder selection signal generation unit 63, a stock register selection signal generation unit 64, a data request generation unit 65, and a data amount monitoring unit 66. The barrel shifter 43 may include a stock-register and barrel-shifting unit 67 and a data-selection and signal-generation unit 68.

The frame counter 61 counts rows and columns of an OTU3 frame based on frame pulses supplied from the OTU3 framing unit 46.

The timing signal generation unit 62 receives a multi-frame count from the OTU3 framing unit 46 and receives counts of the rows and columns of the OTU3 frame from the frame counter 62. The timing signal generation unit 62 also receives JC byte information from the JC determination units 42-1 through 42-32. Further, the timing signal generation unit 62 receives, via the CPU interface 45, external setting signals (or multiplex structure identifier (MSI) information) such as a top-in-group indicator (I_MBTOP), a position-in-group indicator (I_MBPOS), PJO interpretation, an input format and group setting (I_MSIDT), and a payload type (2.5 Gbps/1.25 Gbps). Based on the received information described above, the timing signal generation unit 62 generates timing signals such as a payload enable signal, a barrel shift control timing signal, a data selection timing signal (enable signal for each TS), a FAS timing (NJO execution timing) signal for each TS, and a PJO timing (PJO execution timing) signal for each TS, and also generates JC values after JC determination.

The CH reorder selection signal generation unit 63 generates a selection signal (data sel) based on external, setting signals including the input format and group setting (I_MSIDT), the payload type, a barrel shift selection setting (I_MBBST) indicating a destination (a changed channel number) after JC determination, the payload enable signal, and the barrel shift control timing signal. The selection signal (data sel) is used to select data to be barrel-shifted based on the amount of data in a stock register.

The stock register selection signal generation unit 64 generates a selection signal (stock sel) based on the payload enable signal, the barrel shift control timing signal, the enable signal for each TS, and stock information received from the data amount monitoring unit 66. The selection signal (stock sel) is used to select data to be barrel-shifted before being written in vacant positions in the stock register.

The data request generation unit 65 determines whether to read data based on the payload enable signal, the barrel shift control timing signal, the enable signal for each TS, the stock information received from the data amount monitoring unit 66, and vacant information of the stock register, and generates a data request signal (data request).

The data amount monitoring unit 66 monitors the amount of data stocked in the stock register based on the barrel shift control timing signal, the enable signal for each TS, and the JC values after JC determination.

The stock-register and barrel-shifting unit 67 receives data for the number of channels in units of bytes from the buffers 41-1 through 41-32, stocks the data in the stock register based on the frame pulses, the JC values after JC determination, and the selection signal (stock sel), and barrel-shifts the data. The stock-register and barrel-shifting unit 67 outputs JC-processed aligned data that can be directly mapped to the payload of the OTUk frame.

The data-selection and signal-generation unit 68 receives data for the number of channels in units of bytes from the stock-register and barrel-shifting unit 67, and maps the data to the payload of an OTUk frame (e.g., an OTU3 frame) based on the frame pulses, the JC values after JC determination, the payload enable signal, the FAS timing signal for each TS, the PJO timing signal for each TS, the selection signal (data sel), and the data request signal (data request). Also, the data-selection and signal-generation unit 68 generates frame pulses and a data enable signal (data enable) and supplies the frame pulses and the data enable signal to the OTU3 framing unit 46 together with the OTUk frame.

<External Settings>

FIG. 20 is a drawing illustrating exemplary external settings supplied from the CPU 47. In FIG. 20, the barrel shift selection setting (I_MBBST) indicating a destination (a changed channel number) after JC determination, the top-in-group indicator (I_MBTOP), the input format and group setting (I_MSIDT), and the position-in-group indicator (I_MBPOS) are specified for respective channels #1 through #32. Here, the group setting is used for the concatenation process in a multi-frame configuration. The top-in-group indicator (I_MBTOP) indicates a channel number that comes first in a group.

FIG. 21A illustrates an example of the input format and group setting (I_MSIDT). Here, the input format indicates the type of an input frame such as ODU1 or ODU2, and the group setting is used to form a multi-frame. In FIG. 21A, input format="01" (ODU2) and TS combination-"0x00" are specified for channels #1-#7 and #24 that form group #0. Input format="01" (ODU2) and TS combination="0x01" are specified for channels #8, #10-#12, #14, #15, #17, and #19 that form group #1. Input format="00" (ODU1) and TS combination="0x00" are specified for channels #9 and #13 that form group #2. Input format="00" (ODU1) and TS combination="0x01" are specified for channels #16 and #18 that form group #3. Input format="00" (ODU1) and TS combination="0x02" are specified for channels #20 and #21 that form group #4. Input format="00" (ODU1) and TS combination="0x03" are specified for channels #22 and #23 that form group #5. Input format-="01" (ODU2) and TS combination="0x02" are specified for channels #25-#32 that form group #6.

FIG. 21B is an example of the barrel shift selection setting (I_MBBST). In FIG. 21B, the original channel number of channel #1 is 0x00 (0x indicates hexadecimal notation), the original channel number of channel #2 is 0x01, . . . , and the original channel number of channel #8 is 0x007.

In this case, according to the barrel shift selection setting (I_MBBST) for channel #1, the channel number of channel #1 is changed to 0x07 when JC=+2, changed to 0x06 when JC=+1, changed to 0x01 when JC=−1, and changed to 0x02 when JC=−2. Similarly, according to the barrel shift selection setting (I_MBBST) for channel #2, the channel number 0x01 of channel #2 is changed to 0x00 when JC=+2, changed to 0x07 when JC=+1, changed to 0x02 when JC=−1, and changed to 0x03 when JC=−2.

<Operations of Barrel Shifter>
<JC=+1>

Figure 22:
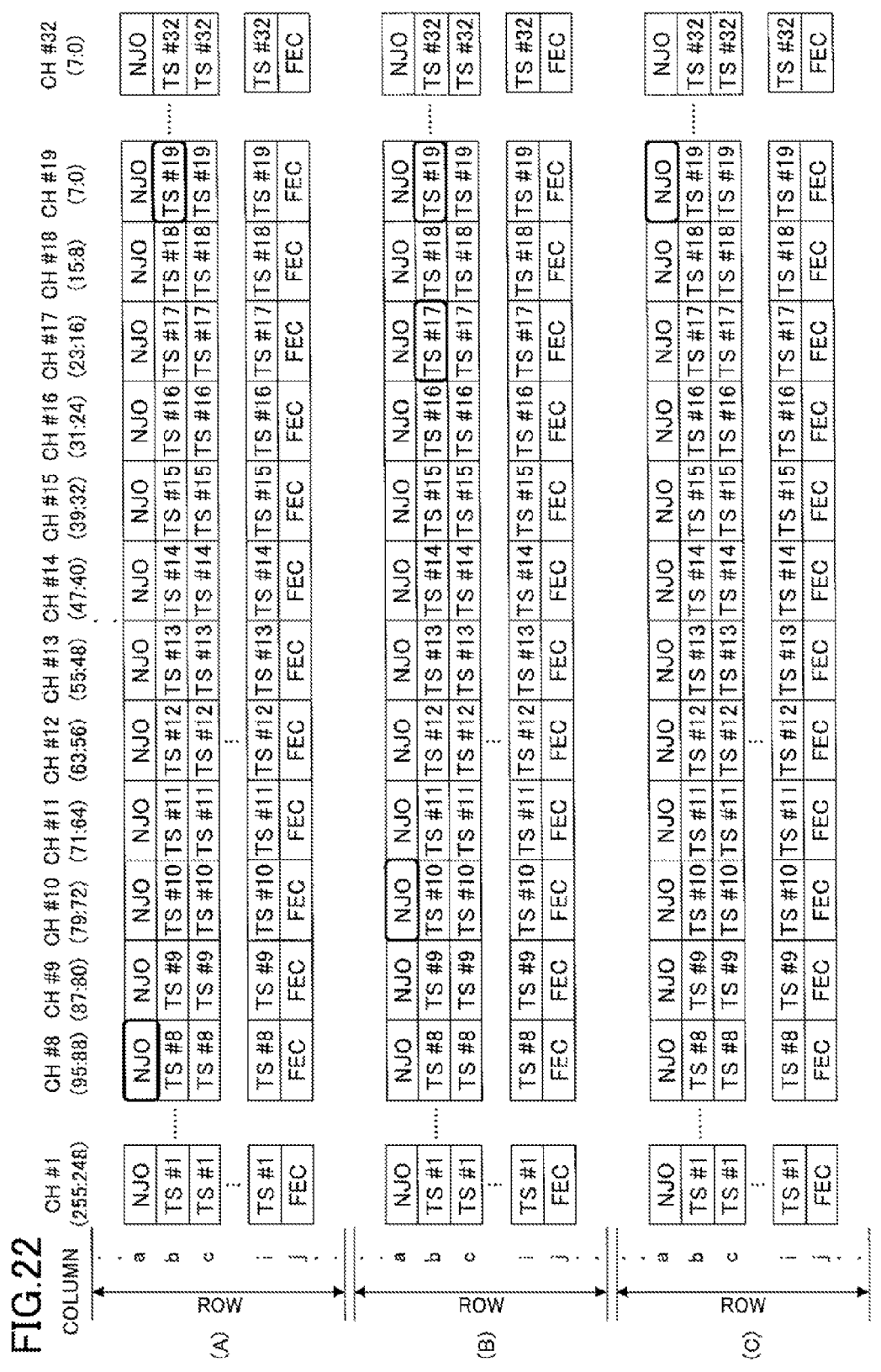

Exemplary operations of the barrel shifter 43 are described below based on an assumption that the JC value is +1 for channels #8, #10, #11, #12, #14, #15, #17, and #19 that form group #1 according to the group setting of FIG. 20. In FIGS. 22 and 23, tributary slots (TS) are arranged in rows a, b, c, . . . , i, and j; channels #1 through #32 are arranged in the horizontal direction, and the vertical direction is the time direction. FIG. 22 illustrates input channels of the barrel shifter 43 and FIG. 23 illustrates output channels of the barrel shifter 43.

In FIG. 22 (A), NJOs are present in channels #1 through #32 of row "a", tributary slots (TS) with tributary slot numbers #1 through #32 are present in channels #1 through #32 of rows "b", "c", and "i", and FECs are present in channels #1 through #32 of row "j". When the input channels are as illustrated in FIG. 22 (A), NJO in channel #8 of row "a" is determined to be data in JC determination.

As a result, as illustrated in FIG. 23 (A), NJO (data) is inserted in channel #8, which is the first frame in group #1, of row "b"; TS #8, #10, #11, #12, #14, #15, and #17 of row "b" are shifted to channels #10, #11, #12, #14, #15, #17, and #19 (TS #9, #13, #16, and #18 belonging to other groups are not shifted); and TS #19 is shifted out and stocked. Then, data enable of row "b" is set at "1" and the data of row "b" are output.

When the input channels are as illustrated in FIG. 22 (B), NJO in channel #10 of row "a" is determined to be data in JC determination. As a result, as illustrated in FIG. 23 (B), NJO (data) is inserted in channel #8, which is the first frame in group #1, of row "b"; the stocked TS #19 is inserted in channel #10; TS #8, #10, #11, #12, #14, and #15 of row "b" are shifted to channels #11, #12, #14, #15, #17, and #19; and TS #17 and #19 are stocked. Then, data enable of row "b" is set at "1" and the data of row "b" are output.

When there are seven stocked TSs and the input channels are as illustrated in FIG. 22 (C), NJO in channel #19 of row "a" is determined to be data in JC determination. In this case, since there are seven stocked TSs, one word=8 TSs is completed by inserting NJO (data). Therefore, as illustrated in FIG. 23 (C), stocked TS #10, #11, #12, #14, #15, #17, and #19 are inserted in channels #8, #10, #11, #12, #14, #15, and #17 of row "a", and NJO (data) is inserted in channel #19 of row "a". Then, data enable of row "a" is set at "1" and the data of row "a" are output.

<JC=−1>

Figure 24:
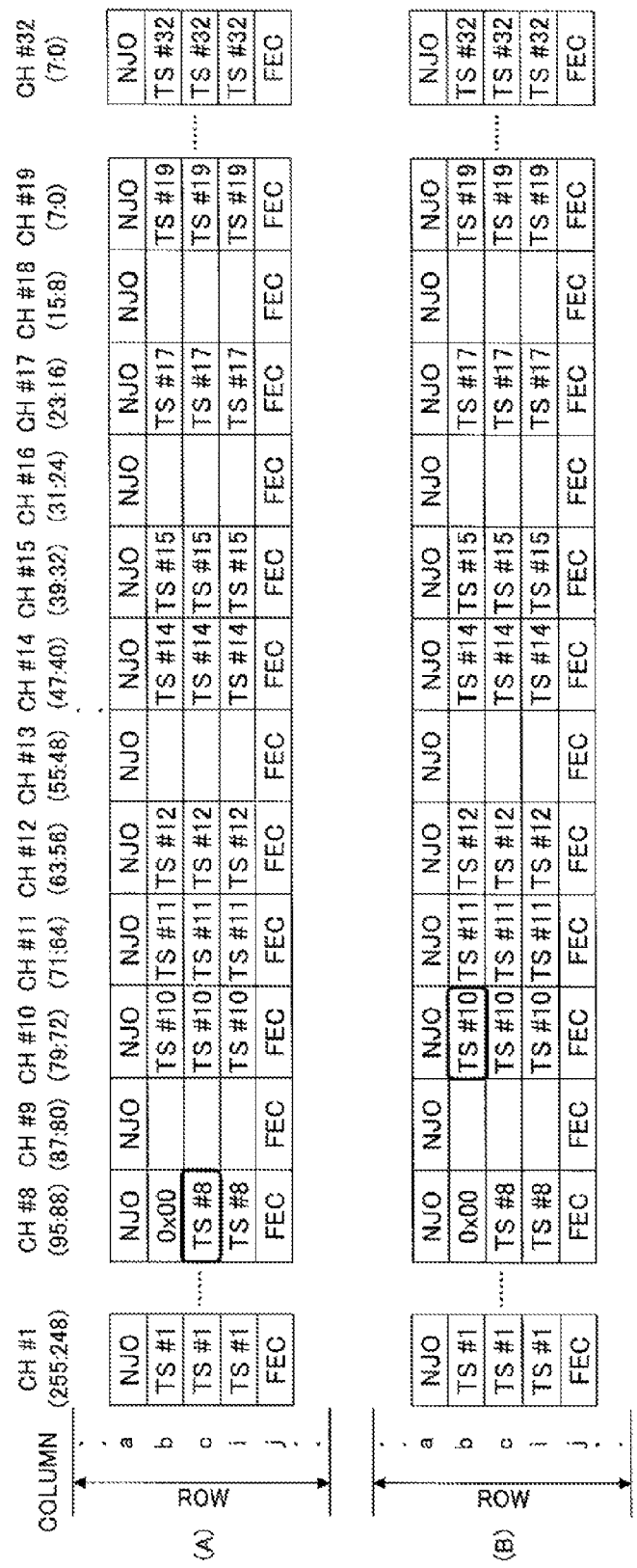
FIG. 24 is another drawing used to describe operations of a barrel shifter.
Figure 25:
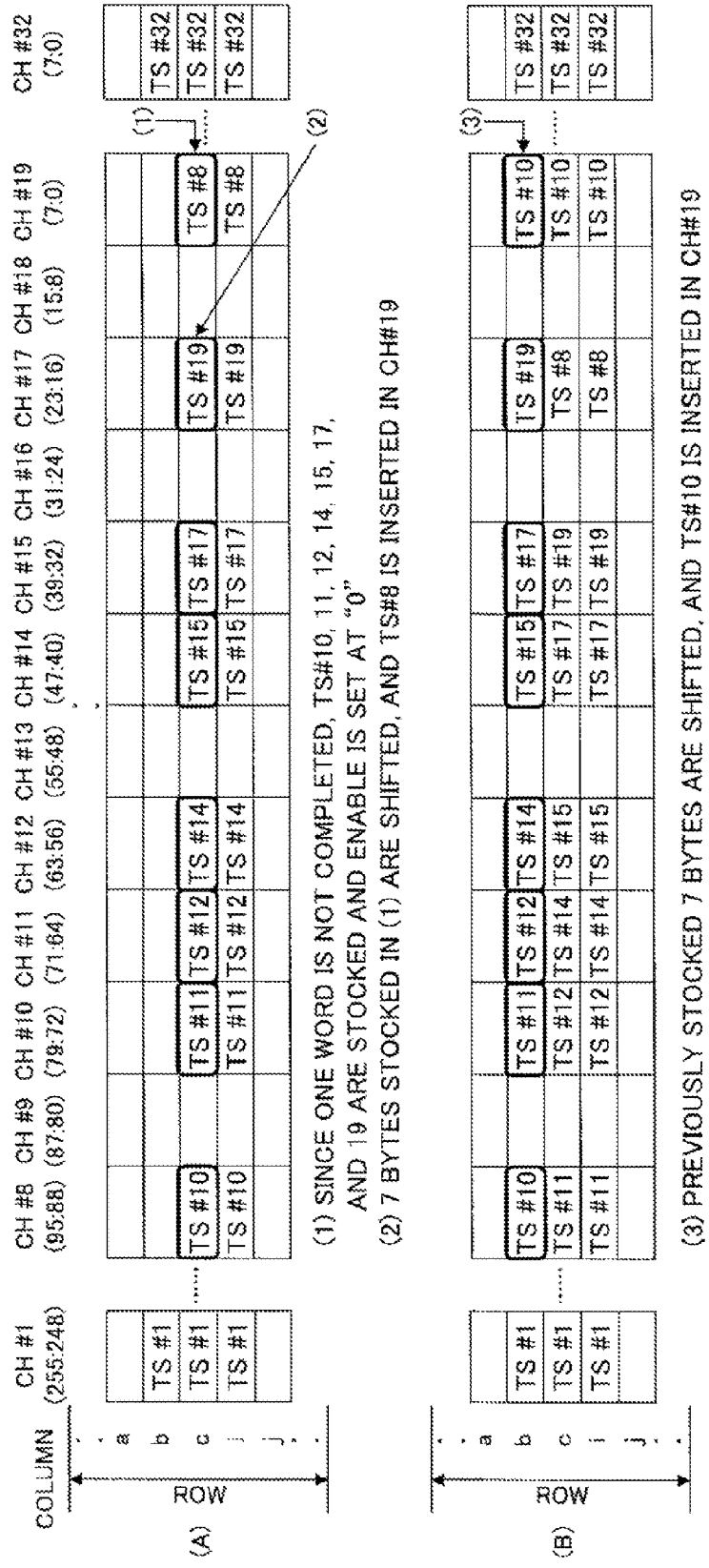
FIG. 25 is another drawing used to describe operations of a barrel shifter.

Exemplary operations of the barrel shifter 43 are described below based on an assumption that the JC value is −1 for channels #8, #10, #11, #12, #14, #15, #17, and #19 that form group #1 according to the group setting of FIG. 20. In FIGS. 24 and 25, tributary slots (TS) are arranged in rows a, b, c, . . . , i, and j; channels #1 through #32 are arranged in the horizontal direction, and the vertical direction is the time direction. FIG. 24 illustrates input channels of the barrel shifter 43 and FIG. 25 illustrates output channels of the barrel shifter 43.

In FIG. 24 (A), based on JC determination, a stuff byte 0x00 is inserted in channel #8 of row "b" which is the first frame in group #1. Accordingly, in row "b", one word=8 TSs of group #1 is not completed.

Therefore, as illustrated in FIG. 25 (A), TS #10, #11, #12, #14, #15, #17, and #19 in row "b" are stocked, and data enable of row "b" is set at "0" to not output the data. Stocked TS #10, #11, #12, #14, #15, #17, and #19 are shifted to row "c" and TS #8 originally in channel #8 of row "c" is inserted in channel #19 of row "c".

In FIG. 24 (B), based on JC determination, a stuff byte 0x00 is inserted in channel #8 of row "b". As illustrated in FIG. 25 (B), previously stocked TS #10, #11, #12, #14, #15, #17, and #19 are shifted to row "b", and TS #10 input via channel #10 of current row "b" is inserted in channel #19 of row "b". Then, data enable of row "b" is set at "1" and the data of row "b" are output.

<JC=−2>

Figure 26:
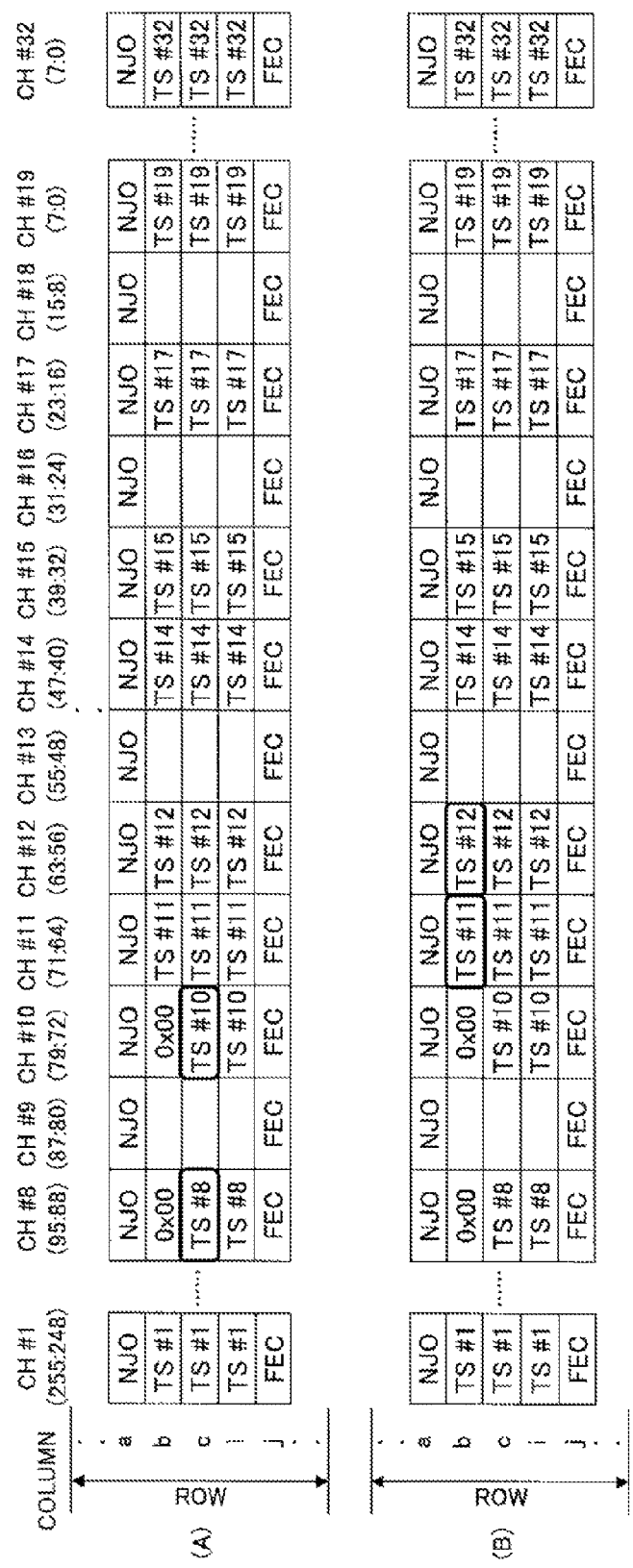
FIG. 26 is another drawing used to describe operations of a barrel shifter.

Exemplary operations of the barrel shifter 43 are described below based on an assumption that the JC value is −2 for channels #8, #10, #11, #12, #14, #15, #17, and #19 that form group #1 according to the group setting of FIG. 20. In FIGS. 26 and 27, tributary slots (TS) are arranged in rows a, b, c, . . . , i, and j; channels #1 through #32 are arranged in the horizontal direction, and the vertical direction is the time direction. FIG. 26 illustrates input channels of the barrel shifter 43 and FIG. 27 illustrates output channels of the barrel shifter 43.

In FIG. 26 (A), based on JC determination, stuff bytes 0x00 are inserted in channels #8 and #10 of row "b" which are the first and second frames in group #1. Accordingly, in row "b", one word=8 TSs of group #1 is not completed.

Therefore, as illustrated in FIG. 27 (A), TS #11, #12, #14, #15, #17, and #19 in row "b" are stocked, and data enable of row "b" is set at "0" to not output the data. Stocked TS #11, #12, #14, #15, #17, and #19, and #19 are shifted to row "c", and TS #8 and #10 originally in channels #8 and #10 of row "c" are inserted in channels #17 and #19 of row "c".

In FIG. 26 (B), based on JC determination, stuff bytes 0x00 are inserted in channels #8 and #10 of row "b". As illustrated in FIG. 27 (B), previously stocked. TS #11, #12, #14, #15, #17, and #19 are shifted to row "b", and TS #11 and #12 input via channels #11 and #12 of current row "b" are inserted in channels #17 and #19 of row "b". Then, data enable of row "b" is set at "1" and the data of row "b" are output.

As described above, a barrel shifter of an embodiment has a capability to process a multiplexed transmission frame such as an OTU3 frame and includes functions to perform intermediate framing, port switching, and slot switching. This configuration makes it possible to implement a multiplexing unit with a circuit size that matches the transmission volume of a multiplexed transmission frame and thereby makes it possible to reduce the circuit size. Also, according to an embodiment, a barrel shifter is controlled to perform a concatenation process for each group of input channels. This configuration makes it possible to flexibly process various types of input ODUj frames.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. An apparatus for mapping multiple lower-speed signal transmission frames to a higher-speed signal transmission frame, the apparatus comprising:
    a plurality of buffers configured to buffer the lower-speed signal transmission frames, wherein when a minimum unit of the lower-speed signal transmission frames is a channel, a number of the buffers corresponds to a maximum number of channels that can be multiplexed in the higher-speed signal transmission frame;
    a plurality of determination units configured to determine frequency justification information for the lower-speed signal transmission frames, a number of the determination units corresponding to the maximum number of channels;
    a barrel shifter configured to receive signals output from the buffers; and
    a controller configured to control the barrel shifter to map the lower-speed signal transmission frames to the higher-speed signal transmission frame based on external settings for the respective lower-speed signal transmission frames and the frequency justification information determined by the determination units.

2. The apparatus as claimed in claim 1, wherein when each of the lower-speed signal transmission frames includes multiple channels, the controller is configured to control the barrel shifter to treat the multiple channels as a group and perform a concatenation process for the group.

3. The apparatus as claimed in claim 2, wherein the determination units are configured to determine the frequency justification information when an asynchronous mapping procedure is employed for mapping the lower-speed signal transmission frames to the higher-speed signal transmission frames.

4. A method of mapping multiple lower-speed signal transmission frames to a higher-speed signal transmission frame, the method comprising:
    buffering, by buffers, the lower-speed signal transmission frames, wherein when a minimum unit of the lower-speed signal transmission frames is a channel, a number of the buffers corresponds to a maximum number of channels that can be multiplexed in the higher-speed signal transmission frame;
    determining, by determination units, frequency justification information for the lower-speed signal transmission frames, a number of the determination units corresponding to the maximum number of channels;
    receiving, by a barrel shifter, signals output from the buffers; and
    controlling the barrel shifter to map the lower-speed signal transmission frames to the higher-speed signal transmission frame based on external settings for the respective lower-speed signal transmission frames and the frequency justification information determined by the determination units.

5. The method as claimed in claim 4, wherein when each of the lower-speed signal transmission frames includes multiple channels, the barrel shifter is controlled to treat the multiple channels as a group and to perform a concatenation process for the group.

6. The method as claimed in claim 5, wherein the frequency justification information is determined by the determination units when an asynchronous mapping procedure is employed for mapping the lower-speed signal transmission frames to the higher-speed signal transmission frames.

* * * * *